(12) United States Patent
Nishiwaki

(10) Patent No.: US 7,720,372 B2
(45) Date of Patent: May 18, 2010

(54) PHOTOGRAPHING DEVICE, PHOTOGRAPHING METHOD, AND PROGRAM FOR PHOTOGRAPHING A PLURALITY OF IMAGES CONSECUTIVELY BY CHANGING AN EXPOSURE VALUE

(75) Inventor: Kazuhiko Nishiwaki, Kanagawa (JP)

(73) Assignee: Sony Corporation (JP)

( * ) Notice: Subject to any disclaimer, the term of this patent is extended or adjusted under 35 U.S.C. 154(b) by 286 days.

(21) Appl. No.: 11/897,269

(22) Filed: Aug. 29, 2007

(65) Prior Publication Data

US 2009/0003819 A1    Jan. 1, 2009

(30) Foreign Application Priority Data

Sep. 1, 2006    (JP)    ............... P2006-238108

(51) Int. Cl.
   *G03B 7/00*    (2006.01)
(52) U.S. Cl. ............... 396/222; 348/362; 348/221.1
(58) Field of Classification Search ............... 396/222
   See application file for complete search history.

(56) References Cited

U.S. PATENT DOCUMENTS

| 4,914,466 A * | 4/1990 | Wakabayashi et al. ...... 396/222 |
| 5,333,027 A * | 7/1994 | Matsushima ............... 396/130 |
| 7,098,946 B1 | 8/2006 | Koseki et al. |
| 2006/0250515 A1 | 11/2006 | Koseki et al. |

FOREIGN PATENT DOCUMENTS

| JP | 4-029125 A | 1/1992 |
| JP | 11-072816 A | 3/1999 |
| JP | 2000-092378 A | 3/2000 |
| JP | 2003-348438 A | 12/2003 |
| JP | 2005-210445 A | 8/2005 |
| JP | 2006-166027 A | 6/2006 |

OTHER PUBLICATIONS

Nikon Press release announcing D200 dSLR camera, obtained from http://press.nikonusa.com/2005/11/nikon_unveils_the_new_d200_dig.php on Aug. 5, 2009; establishes release date for camera and user guide on Nov. 1, 2005.*
Nikon D200 User's Guide, obtained from http://www.henrys.com/manuals/nikon/d200_manual.pdf on Aug. 5, 2009; copy also available at http://www.nikonusa.com/pdf/manuals/noprint/D200_en_noprint.pdf.*

* cited by examiner

*Primary Examiner*—Melissa J Koval
*Assistant Examiner*—Bret Adams
(74) *Attorney, Agent, or Firm*—Lerner, David, Littenberg, Krumholz & Mentlik, LLP

(57) ABSTRACT

A photographing device configured to photograph a plurality of images consecutively by changing an exposure value is provided. The photographing device may include a control-range-determination unit configured to determine a control range which is a range where the exposure value is varied, and an interval-calculation unit configured to calculate a control interval which is an interval between photographing-exposure values that are exposure values existing in the control range and that are exposure values of the photographed images so that the photographing-exposure values are uniformly distributed over the control range according to a number of the photographed images.

8 Claims, 14 Drawing Sheets

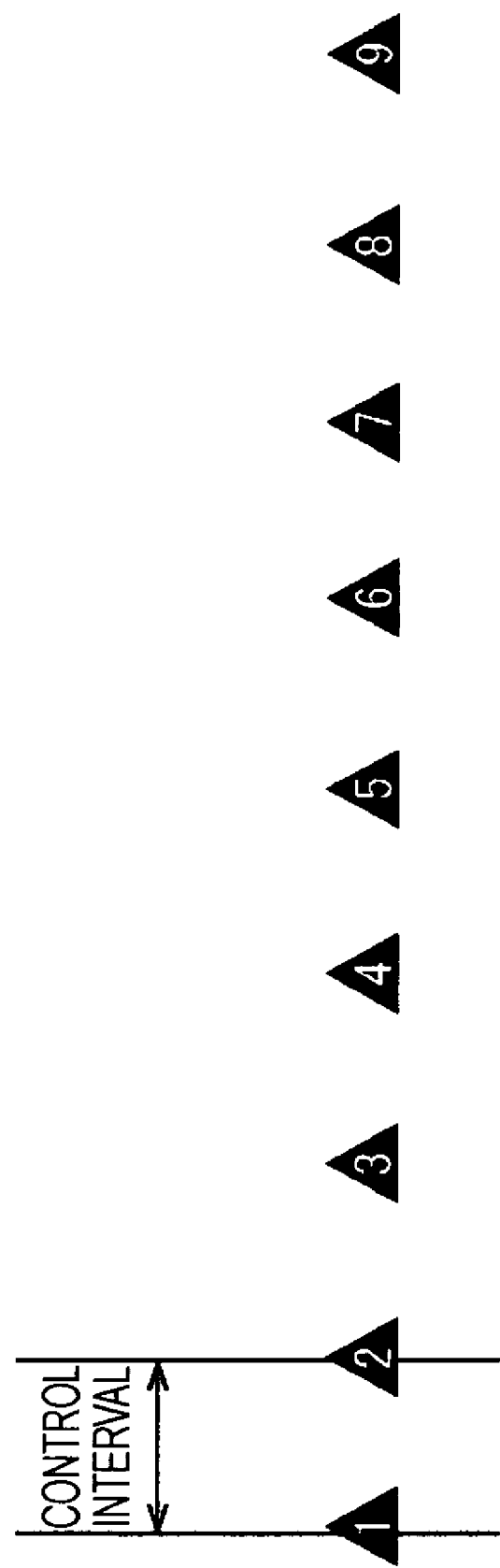

PHOTOGRAPHING DEVICE, PHOTOGRAPHING METHOD, AND PROGRAM FOR PHOTOGRAPHING A PLURALITY OF IMAGES CONSECUTIVELY BY CHANGING AN EXPOSURE VALUE

CROSS-REFERENCE TO RELATED APPLICATIONS

This application claims priority from Japanese Patent Application No. JP 2006-238108 filed in the Japanese Patent Office on Sep. 1, 2006, the entire content of which is incorporated herein by reference.

BACKGROUND OF THE INVENTION

1. Field of the Invention

The present invention relates to a photographing device, a photographing method, and a program, and particularly relates to a photographing device, a photographing method, and a program that are provided to photograph a plurality of images with different brightness levels consecutively.

2. Description of the Related Art

In general, when photographing is performed according to an auto-exposure method by using a photographing device such as a digital camera, the photographing device is provided with a function of performing the so-called auto-exposure (AE)-bracket photographing. During the AE-bracket photographing, a plurality of images obtained through different exposures is photographed at the same time, where the images correspond to a reference-exposure value calculated by a processor or the like provided in the photographing device, a value lower than the reference-exposure value by as much as a predetermined amount, and a value higher than the reference-exposure value by as much as the predetermined amount.

During the AE-bracket photographing, a user specifies the brightness quantity with reference to reference brightness so that photographing is performed while increasing and/or decreasing the reference brightness by as much as predetermined quantity.

As a technology achieved by using the above-described images obtained through the different exposures, a photographing device performing the so-called overlap photographing had been proposed, as disclosed in Japanese Unexamined Patent Application Publication No. 2000-92378, for example. The overlap photographing is performed to generate the composite image corresponding to a wide-dynamic range by merging the image signals corresponding to a plurality of images with different exposure amounts, for example.

SUMMARY OF THE INVENTION

However, when a brightness amount specified by the user is too large, it becomes difficult to control the brightness and many images with the same brightness are photographed. On the other hand, when the brightness amount specified by the user is too small, many images with brightness amounts that are hardly different from each other and/or almost the same as each other are photographed. If many images of the same brightness are photographed in the above-described manner, memory is wasted.

Particularly, when the number of photographed images is increased, it becomes difficult to ignore the above-described wasted memory. Therefore, since it is difficult for the user to know a photographing result before performing photographing, the AE-bracket photographing is not fit for a user who is not accustomed to photographing.

Accordingly, an embodiment of the present invention allows for photographing a plurality of images with brightness levels that are sufficiently different from each other consecutively and reliably.

A photographing device according to an embodiment of the present invention is configured to photograph a plurality of images consecutively by changing an exposure value, where the photographing device may include a control-range-determination unit configured to determine a control range which is a range where the exposure value is varied, and an interval-calculation unit configured to calculate a control interval which is an interval between photographing-exposure values that are exposure values existing in the control range and that are exposure values of the photographed images so that the photographing-exposure values are uniformly distributed over the control range according to a number of the photographed images.

The control-range-determination unit may determine a range where the exposure value is varied according to at least one and/or a combination of at least two of an aperture value, a shutter speed, and a gain of an image signal to be the control range.

The control-range-determination unit may determine a control-minimum value which is a minimum value of the exposure value existing in the control range, and the photographing device may further include an exposure-value-calculation unit configured to calculate the photographing-exposure values distributed over the control range based on the photograph number, the control interval, and the control-minimum value.

The control-range-determination unit may determine a control-maximum value which is a maximum value of the exposure value existing in the control range, and the photographing device may further include an exposure-value-calculation unit configured to calculate the photographing-exposure values distributed over the control range based on the photograph number, the control interval, and the control-maximum value.

The control-range-determination unit may determine a controllable range where the photographing device can physically control the exposure value to be the control range.

The control-range-determination unit may determine a predetermined range to be the control range, where the predetermined range includes a range extending from a standard value of the exposure value to a value smaller than the standard value by as much as a size of a smaller one of a difference between the standard value and a maximum value of a controllable range where the photographing device can physically control the exposure value and a difference between the standard value and a minimum value of the controllable range, and a range extending from the standard value to a value larger than the standard value by as much as the size of the smaller one.

The interval-calculation unit may determine whether or not the control interval is equivalent to a predetermined threshold value or more, decrement the photograph number until the control interval is equivalent to the threshold value or more when the control interval is smaller than the threshold value, and calculate the control interval according to the decremented photograph number.

A photographing method according to another embodiment of the present invention is provided to photograph a plurality of images consecutively by changing an exposure value, where the photographing method may include determining a control range which is a range where the exposure value is varied, and calculating a control interval which is an interval between photographing-exposure values that are exposure values existing in the control range and that are exposure values of the photographed images so that the photographing-exposure values are uniformly distributed over the control range according to a number of the photographed images.

A program according to another embodiment of the present invention makes a computer execute photographing processing, so as to photograph a plurality of images consecutively by changing an exposure value, where the program may include determining a control range which is a range where the exposure value is varied, and calculating a control interval which is an interval between photographing-exposure values that are exposure values existing in the control range and that are exposure values of the photographed images so that the photographing-exposure values are uniformly distributed over the control range according to the number of the photographed images.

According to an embodiment of the present invention, a control range where an exposure value is varied may be determined, and a control interval which is an interval between photographing-exposure values that are exposure values existing in the control range and that are exposure values of the photographed images may be calculated so that the photographing-exposure values are uniformly distributed over the control range according to the number of photographed images.

Thus, according to an embodiment of the present invention, a plurality of images may be photographed consecutively. Particularly, according to an embodiment of the present invention, a plurality of images with brightness levels sufficiently different from each other may be photographed consecutively by specifying the photograph number.

BRIEF DESCRIPTION OF THE DRAWINGS

FIG. 14 illustrates the threshold value of the control interval.

DETAILED DESCRIPTION

Before describing an embodiment of the present invention, the correspondence between the features of the claims and the specific elements disclosed in an embodiment of the present invention is discussed below, the embodiment being disclosed in this specification and/or the attached drawings. This description is intended to assure that specific elements disclosed in an embodiment supporting the claimed invention are described in this specification and/or the attached drawings. Thus, even if an element in an embodiment is not described as relating to a certain feature of the present invention, though disclosed in the specification and/or the attached drawings, that does not necessarily mean that the element does not relate to that feature of the claims. Conversely, even if an element is described herein as relating to a certain feature of the claims, that does not necessarily mean that the element does not relate to other features of the claims.

A photographing device according to an embodiment of the present invention is configured to photograph a plurality of images consecutively by changing an exposure value. The photographing device includes a control-range-determination section (e.g., a control-range-determination unit 112 shown in FIG. 7) configured to determine a control range which is a range where the exposure value is varied, and an interval-calculation section (e.g., a control-interval-calculation unit 113 shown in FIG. 7) configured to calculate a control interval which is an interval between photographing-exposure values that are exposure values existing in the control range and that are exposure values of the photographed images so that the photographing-exposure values are uniformly distributed over the control range according to a number of the photographed images.

Figure 8:
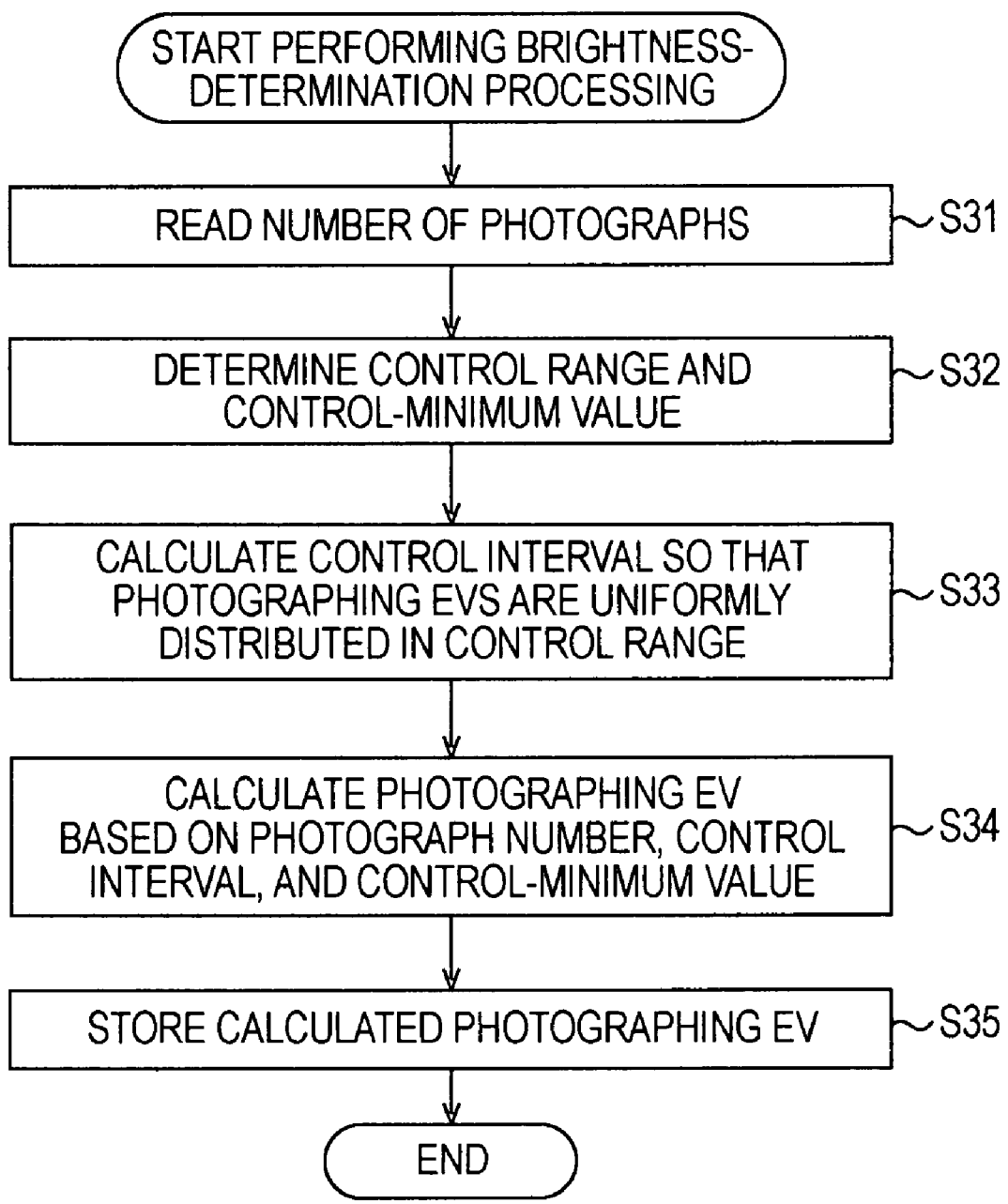
FIG. 8 is a flowchart illustrating brightness-determination processing performed by the digital still camera.

The control-range-determination section may determine a range where the exposure value is varied according to at least one and/or a combination of at least two of an aperture value, a shutter speed, and the gain of an image signal to be the control range (e.g., step S32 shown in FIG. 8).

The control-range-determination section may determine a control-minimum value which is a minimum value of the exposure value existing in the control range (e.g., step S32 shown in FIG. 8), and the photographing device may further include an exposure-value-calculation section (e.g., a photographing-EV-calculation unit 114 shown in FIG. 7) configured to calculate the photographing-exposure values distributed over the control range based on the photograph number, the control interval, and the control-minimum value.

The control-range-determination section may determine a control-maximum value which is a maximum value of the exposure value existing in the control range, and the photographing device may further include an exposure-value-calculation section (e.g., the photographing-EV-calculation unit 114 shown in FIG. 7) configured to calculate the photographing-exposure values distributed over the control range based on the photograph number, the control interval, and the control-maximum value.

Figure 11:
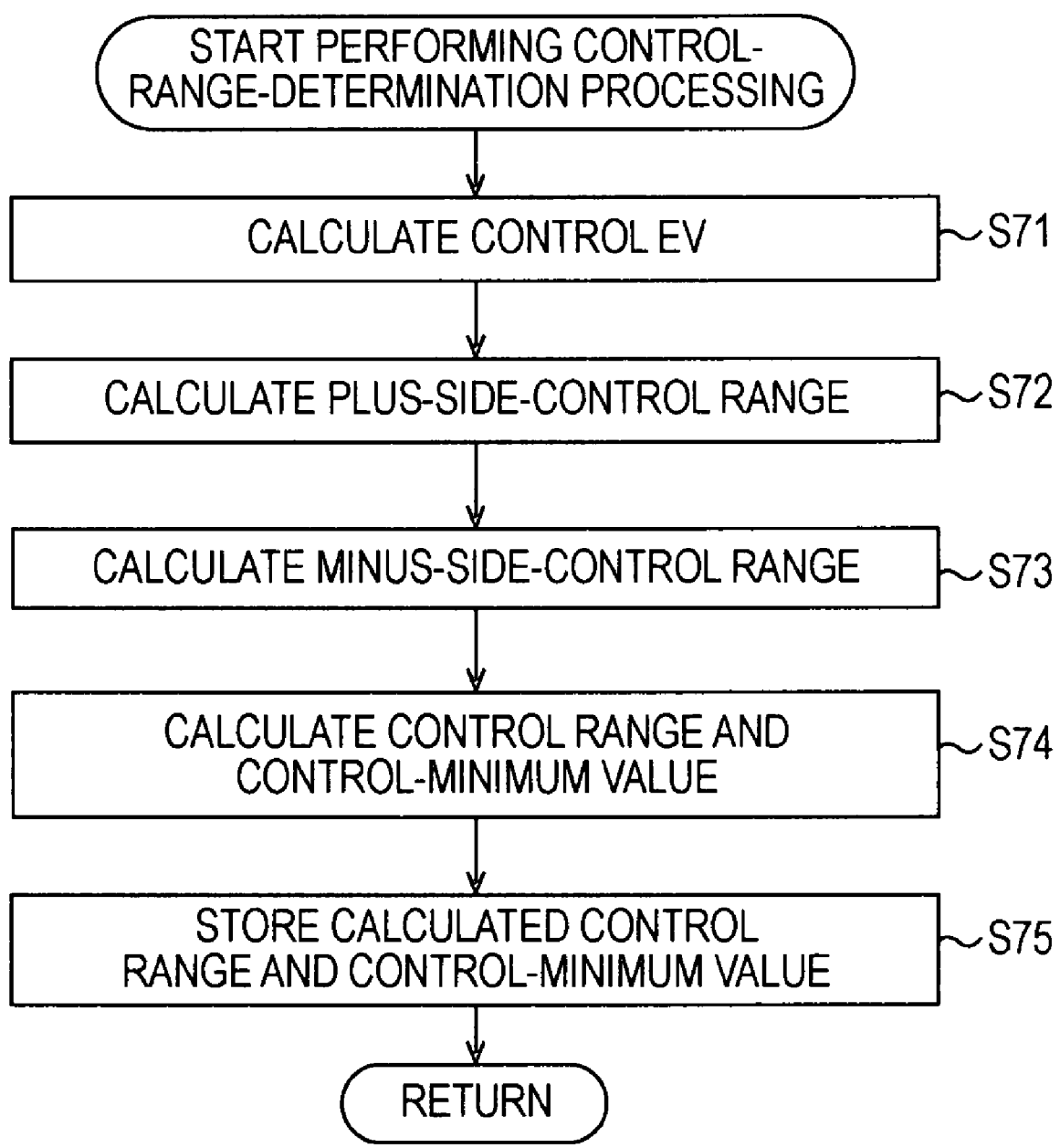
FIG. 11 is a flowchart illustrating details on control-range-determination processing described in FIG. 10.

The control-range-determination section may determine a controllable range where the photographing device can physically control the exposure value to be the control range (e.g., step S74 shown in FIG. 11).

The control-range-determination section may determine a predetermined range to be the control range, where the predetermined range includes a range extending from a standard value of the exposure value to a value smaller than the standard value by as much as a size of a smaller one of a difference between the standard value and a maximum value of a controllable range where the photographing device can physically control the exposure value and a difference between the standard value and a minimum value of the controllable range, and a range extending from the standard value to a value larger than the standard value by as much as the size of the smaller one (e.g., step S74 shown in FIG. 11).

Figure 13:
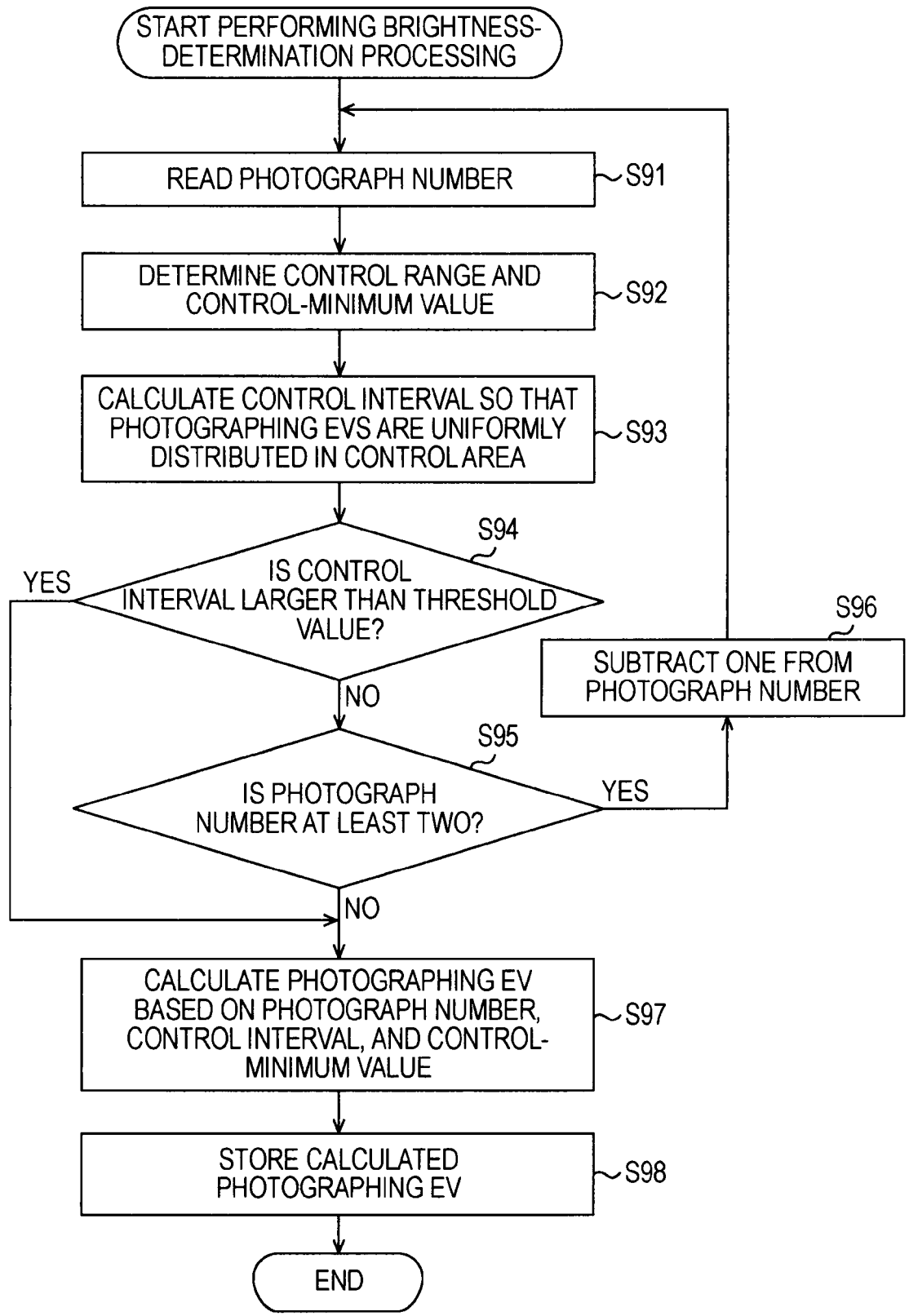
FIG. 13 is a flowchart illustrating brightness-determination processing according to another embodiment of the present invention, the brightness-determination processing being performed by the digital still camera.

The interval-calculation section may determine whether or not the control interval is equivalent to a predetermined threshold value or more (e.g., step S94 shown in FIG. 13), decrement the photograph number until the control interval is equivalent to the threshold value or more when the control interval is smaller than the threshold value (e.g., step S96 shown in FIG. 13), and calculate the control interval according to the decremented photograph number (e.g., step S93 shown in FIG. 13).

A photographing method according to an embodiment of the present invention is provided to photograph a plurality of images consecutively by changing an exposure value, where the photographing method includes the steps of determining a control range which is a range where the exposure value is varied (e.g., step S32 shown in FIG. 8), and calculating a control interval which is an interval between photographing-exposure values that are exposure values existing in the control range and that are exposure values of the photographed images so that the photographing-exposure values are uniformly distributed over the control range according to a number of the photographed images (e.g., step S33 shown in FIG. 8).

A program according to an embodiment of the present invention makes a computer execute photographing processing, so as to photograph a plurality of images consecutively by changing an exposure value, where the program includes the steps of determining a control range which is a range where the exposure value is varied (e.g., step S32 shown in FIG. 8), and calculating a control interval which is an interval between photographing-exposure values that are exposure values existing in the control range and that are exposure values of the photographed images so that the photographing-exposure values are uniformly distributed over the control range according to the number of the photographed images (e.g., step S33 shown in FIG. 8).

Hereinafter, embodiments of the present invention will be described with reference to the attached drawings.

Figure 1:
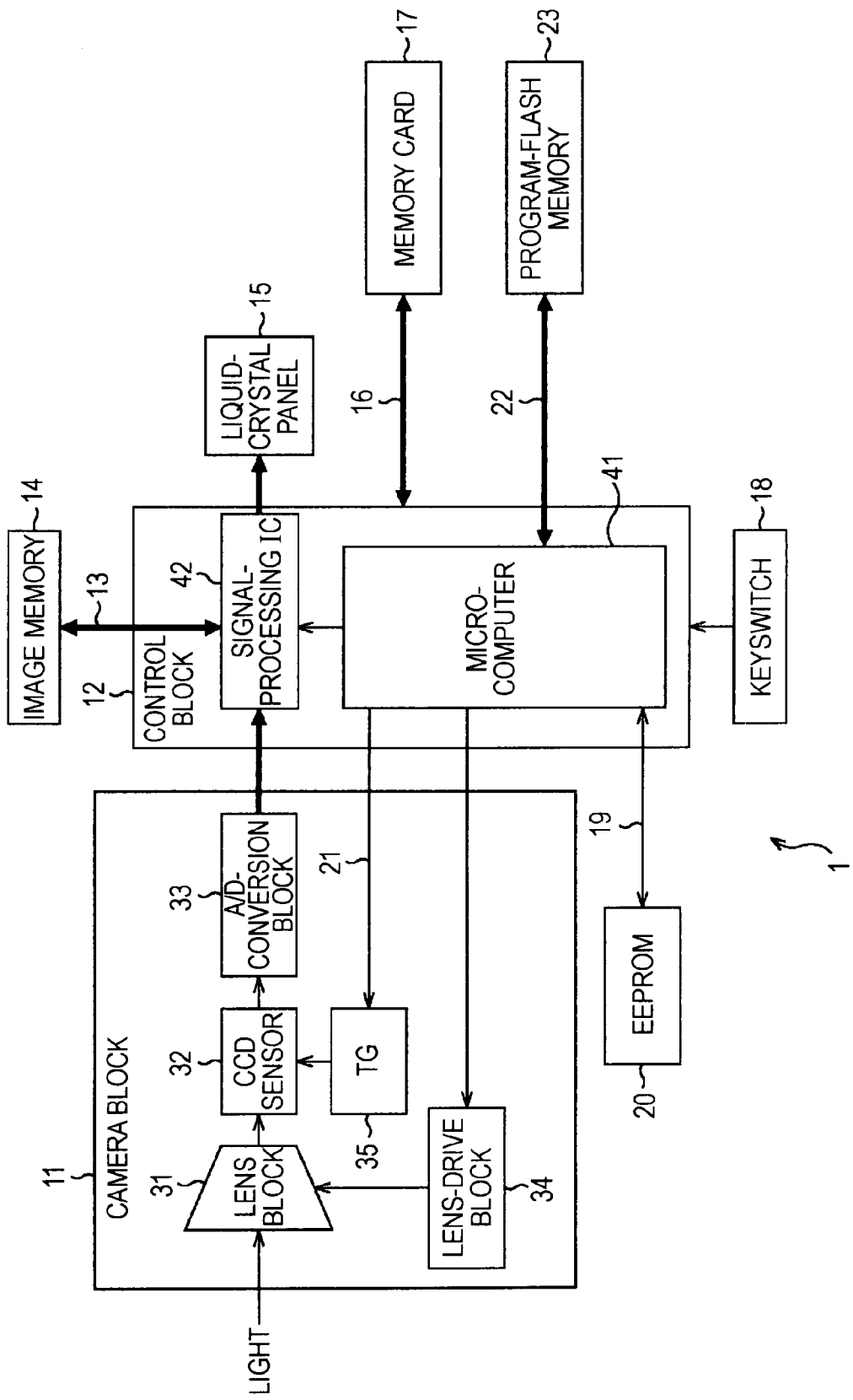
FIG. 1 is a block diagram illustrating the hardware configuration of a digital still camera according to an embodiment of the present invention.

FIG. 1 is a block diagram showing the hardware configuration of a digital camera 1 according to an embodiment of the present invention.

The digital camera 1 includes a camera block 11, a control block 12, an image memory 14, a liquid-crystal panel 15, a keyswitch 18, an electrically-erasable-programmable-read-only memory (EEPROM) 20, and a program-flash memory 23. Further, a memory card 17 is mounted onto the digital camera 1, as required.

Further, the control block 12 and the image memory 14 are connected to each other via a memory bus 13, and the control block 12 and the memory card 17 are connected to each other via a card bus 16. The control block 12 and the EEPROM 20 are connected to each other via a serial input/output (SIO) 19, and the control block 12 and the program-flash memory 23 are connected to each other via a host bus 22. Further, the control block 12 and a timing generator (TG) 35 of the camera block 11 are connected to each other via an SIO 21.

The camera block 11 includes an image-pickup element and an optical system including a lens provided to make the image-pickup element form an image. The camera block 11 forms the image of a subject, performs photoelectric conversion for the formed image, and generates the image data corresponding to the image. The camera block 11 transmits the generated image data to the control block 12.

More specifically, the camera block 11 includes a lens block 31, a charge-coupled-device (CCD) sensor 32 functioning as the image-pickup element, an analog-to-digital (A/D) conversion block 33, a lens-drive block 34, and the timing generator 35.

The lens block 31 includes an optical lens, a focus mechanism, a shutter mechanism, an aperture (iris) mechanism (not shown), and so forth, and collects light reflected by the subject. Namely, the lens block 31 forms the image of light of the subject onto a light-receiving unit of the CCD sensor 32. The lens block 31 is driven by the lens-drive block 34 controlled by the control block 12.

The CCD sensor 32 operates according to a timing signal transmitted from the timing generator 35 controlled by the control block 12, so as to receive light reflected from the subject and performs photoelectric conversion for the received light, the light being made incident via the lens block 31, and transmits an image signal to the A/D-conversion block 33, where the image signal is an analog signal provided, as the electrical signal corresponding to the received-light quantity. The image-pickup element may be provided, as not only the CCD sensor 32, but also a complementary-metal-oxide-semiconductor (CMOS) sensor or the like. It is essential only that the image-pickup element generates an image signal by pixels.

The A/D-conversion block 33 performs A/D conversion for the image signal which is the analog signal transmitted from the CCD sensor 32, and transmits image data expressed in digital signals obtained through the A/D conversion to the control block 12.

The lens-drive block 34 controls the focus position, the closing and opening of an aperture, the zoom position, and the collapsing operation of the lens block 31 under the control of the control block 12.

The timing generator 35 controls the exposure time by generating a timing signal provided to make the CCD sensor 32 operate under the control of the control block 12.

The control block 12 controls each of the units of the digital camera 1.

The control block 12 includes a microcomputer 41 and a signal-processing integrated circuit (IC) 42.

The microcomputer 41 loads a program stored in the program-flash memory 23 via the host bus 22, and performs various types of processing procedures based on an operation signal transmitted from the keyswitch 18. Further, though not shown, the microcomputer 41 includes a volatile internal memory including a dynamic-random-access memory (DRAM) or the like. The volatile internal memory stores data or the like required of the microcomputer 41 to perform various types of processing procedures, and/or loads a program.

The EEPROM 20 stores various data including various types of parameters required of the microcomputer 41 to perform the various types of processing procedures, information about a user, and so forth. The microcomputer 41 reads various data from the EEPROM 20 via the SIO 19 and performs the various types of processing procedures by using the read data. According to the above-described embodiment, the EEPROM 20 may be replaced with the image memory 14 and/or the program-flash memory 23.

Further, the microcomputer 41 controls operations of the lens block 31 by using the lens-drive block 34 and controls operations of the camera block 11 by controlling operations of the CCD sensor 32 by using the timing generator 35 via the SIO 21.

Further, the microcomputer 41 controls the signal-processing IC 42. Under the control of the microcomputer 41, the signal-processing IC 42 performs digital-signal processing such as noise removal for the image data transmitted from A/D-conversion block 33, and transmits the image data to the liquid-crystal panel 15, so as to make the liquid-crystal panel 15 produce the image corresponding to the image data. At that time, the signal-processing IC 42 makes the image memory 14 store the image data, as required, under the control of the microcomputer 41, and performs digital-signal processing for the stored image data. Namely, the signal-processing IC 42 includes a memory-controller block provided to read and/or write data stored in the image memory 14, and the memory-controller block reads image data, menu data, and so forth from the image memory 14, merges (adds) the above-described image data, menu data, and so forth, and makes the liquid-crystal panel 15 display the above-described data, as an image.

Further, the signal-processing IC 42 compresses the image data transmitted from the A/D-conversion block 33 by encoding the image data under a predetermined system including a Joint Photographic Experts Group (JPEG) system or the like, whereby compressed image data is obtained. The signal-processing IC 42 records the compressed image data onto the memory card 17 via the card bus 16. Further, the signal-processing IC 42 reads the compressed image data recorded onto the memory card 17 via the card bus 16, decodes the compressed image data so that the compressed image data is expanded. The signal-processing IC 42 transmits image data obtained through the expansion to the liquid-crystal panel 15 and makes the liquid-crystal panel 15 display the image corresponding to the transmitted image data.

The memory card 17 is an example storage device that can be mounted and/or demounted onto and/or from the digital camera 1. Other than the memory card 17, a removable-recording medium including a digital-versatile disk (DVD), a hard disk, and so forth may be used.

Figure 2:
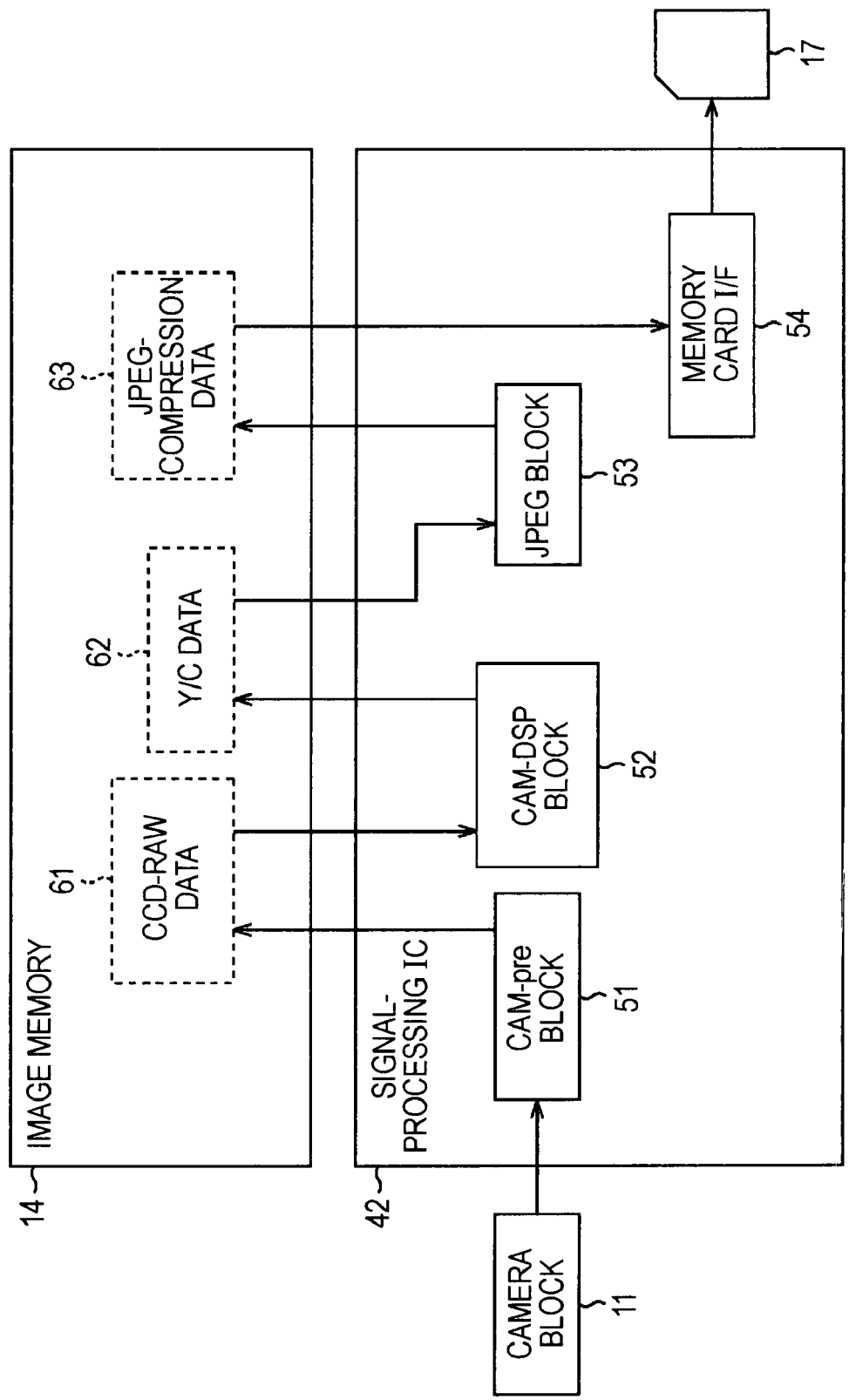
FIG. 2 illustrates the flow of data processing performed by the digital camera during still-image capturing.

Next, FIG. 2 illustrates the flow of data-processing procedures performed by the digital camera 1 while a still image is captured.

According to FIG. 2, the signal-processing IC 42 includes a camera (CAM)-pre block 51, a camera (CAM)-digital-signal-processor (DSP) block 52, a JPEG block 53, and a memory card interface (I/F) 54, for example. The same parts shown in FIG. 2 as those shown in FIG. 1 are designated by the same reference numerals, and descriptions of the same parts shown in FIG. 2 as those shown in FIG. 1 will not be provided, so as to avoid the description duplication.

In FIG. 2, each of rectangles made in solid lines indicates a block provided, as an element of the digital camera 1, and each of rectangles made in broken lines indicates predetermined data.

When a user pressed down a shutter switch which is an example of the keyswitch 18, information about a capture instruction is transmitted from the keyswitch 18 to the microcomputer 41. The microcomputer 41 controls the signal-processing IC 42 based on the capture instruction transmitted from the keyswitch 18 so that the signal-processing IC 42 performs various types of processing for image data transmitted from the camera block 11.

The CAM-pre block 51 performs camera preprocessing for RGB-image data transmitted from the camera block 11, whereby RAW data 61 of the CCD sensor 32 (hereinafter referred to as CCD-RAW data) is obtained, and writes the CCD-RAW data into the image memory 14 via the memory bus 13. Here, the term "camera preprocessing" denotes processing including correction of the pixel defect of an image-pickup element such as the CCD sensor 32, gain adjustment performed to adjust brightness, and so forth.

Next, the CAM-DSP block 52 reads the CCD-RAW data 61 stored in the image memory 14 via the memory bus 13. The CAM-DSP block 52 performs DSP processing for the CCD-RKW data 61 and writes Y/Cb/Cr data (hereinafter referred to as Y/C data) 62 obtained through the DSP processing into the image memory 14 via the memory bus 13. Here, the DSP processing denotes pixel interpolation, filter processing, generation of a brightness signal, and chroma signals Cb and Cr through a matrix calculation, and so forth.

Next, the JPEG block 53 reads the Y/C data 62 stored in the image memory 14 via the memory bus 13. The JPEG block 53 performs JPEG-compression processing for the Y/C data 62 and writes JPEG-compression data 63 obtained through the JPEG-compression processing into the image memory 14 via the memory bus 13.

Then, the signal-processing IC 42 reads the JPEG-compression data 63 and generates data on a file (hereinafter referred to as an image-compression file) based on the JPEG-compression data 63. The memory-card I/F 54 transmits and stores the image-compression-file data into the memory card 17 via the card bus 16 under the control of the signal-processing IC 42.

As described above, the digital camera 1 performs predetermined processing for image data transmitted from the camera block 11 while data on a still image is captured so that the CCD-RAW data 61, the Y/C data 62, and the JPEG-compression data 63 are generated in that order. Further, the digital camera 1 generates data on an image-compression file based on the JPEG-compression data 63 and records the image-compression-file data onto the memory card 17.

Figure 3:
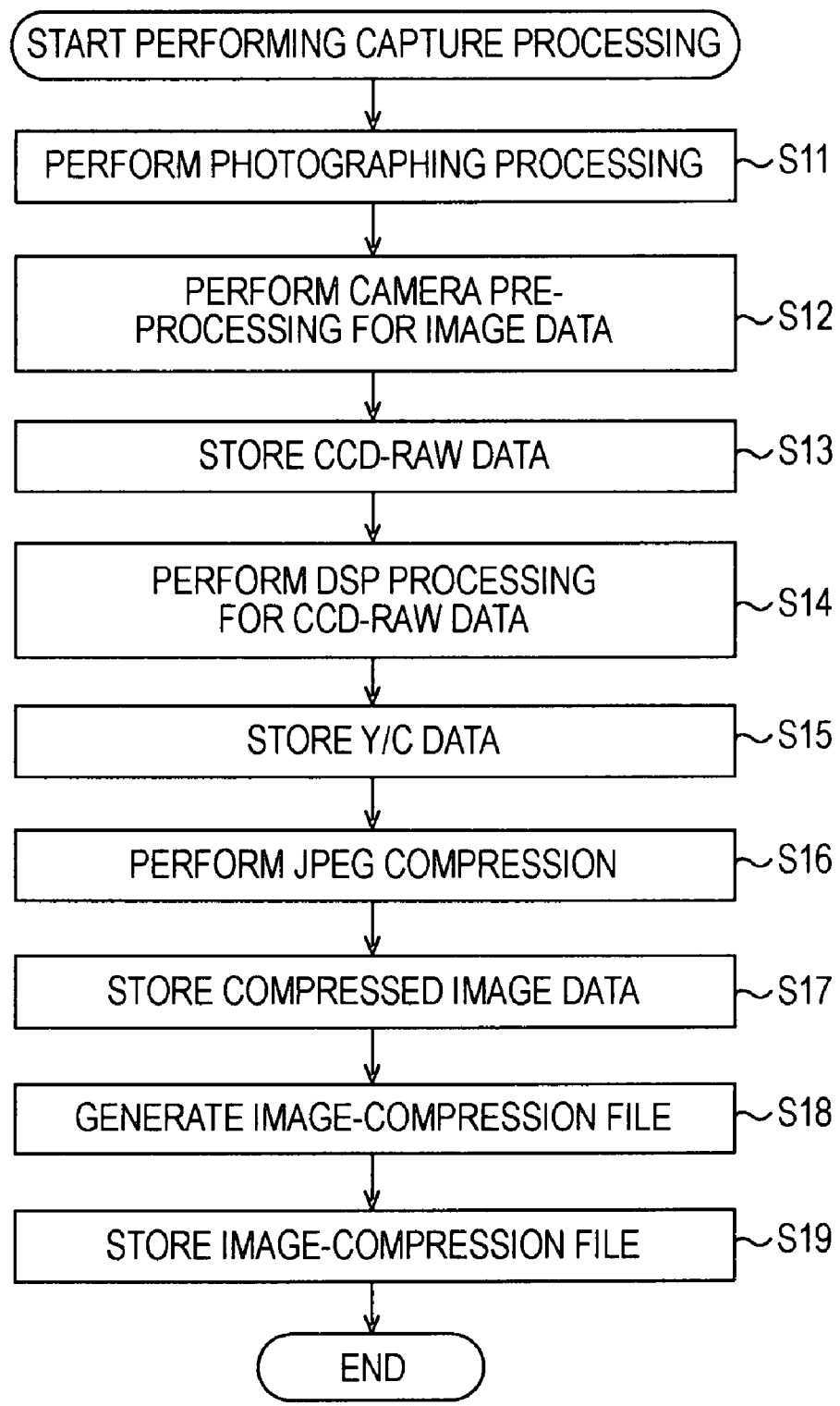
FIG. 3 is a flowchart illustrating still-image-capturing processing performed by the digital still camera.

Next, capture processing performed by the digital camera 1 will be described with reference to a flowchart of FIG. 3.

At step S11, the camera block 11 performs image-pickup processing by forming an image of the subject, performing photoelectric conversion for the formed image, and generating the image data corresponding to the formed image. The camera block 11 transmits the generated image data to the control block 12.

At step S12, the CAM-pre block 51 performs camera preprocessing including pixel-defect correction performed for the CCD sensor 32, brightness adjustment, and so forth for the image data transmitted from the camera block 11 under the control of the microcomputer 41.

At step S13, the CAM-pre block 51 transmits the CCD-RAW data 61 obtained through the camera preprocessing performed for the image data transmitted from the camera block 11 to the image memory 14 via the memory bus 13 under the control of the microcomputer 41. The image memory 14 stores the CCD-RAW data 61.

At step S14, the CAM-DSP block 52 reads the CCD-RAW data 61 stored in the image memory 14 via the memory bus 13 under the control of the microcomputer 41 and performs DSP processing including matrix conversion or the like for the read CCD-RAW data 61.

At step S15, the CAM-DSP block 52 transmits the Y/C data 62 obtained by performing the DSP processing for the CCD-RAW data 61 to the image memory 14 via the memory bus 13. The image memory 14 stores the Y/C data 62. The Y/C data 62 stored in the image memory 14 is read and transmitted to the liquid-crystal panel 15 so that the image corresponding to the Y/C data 62 is displayed. The user operates the shutter switch at predetermined time while looking at the displayed image.

At step S16, the JPEG block 53 reads the Y/C data 62 stored in the image memory 14 via the memory bus 13 at the time where the shutter switch is operated. The JPEG block 53 performs JPEG compression for the read Y/C data 62.

At step S17, the JPEG block 53 transmits the JPEG-compression data 63 obtained through the JPEG-compression processing to the image memory 14 via the memory bus 13. The image memory 14 stores the compressed image data.

At step S18, the signal-processing IC 42 reads the JPEG-compression data 63 and generates data on an image-compression file based on the read JPEG-compression data 63.

At step S19, the memory-card I/F 54 transmits the generated image-compression-file data to the memory card 17 via the card bus 16 under the control of the signal-processing IC 42. The memory card 17 stores the image-compression-file data, whereby the capture processing performed by the digital camera 1 is finished.

Thus, the digital camera 1 captures data on a still image.

Here, the digital camera 1 has a function of capturing not only the still-image data, but also video data.

Figure 4:
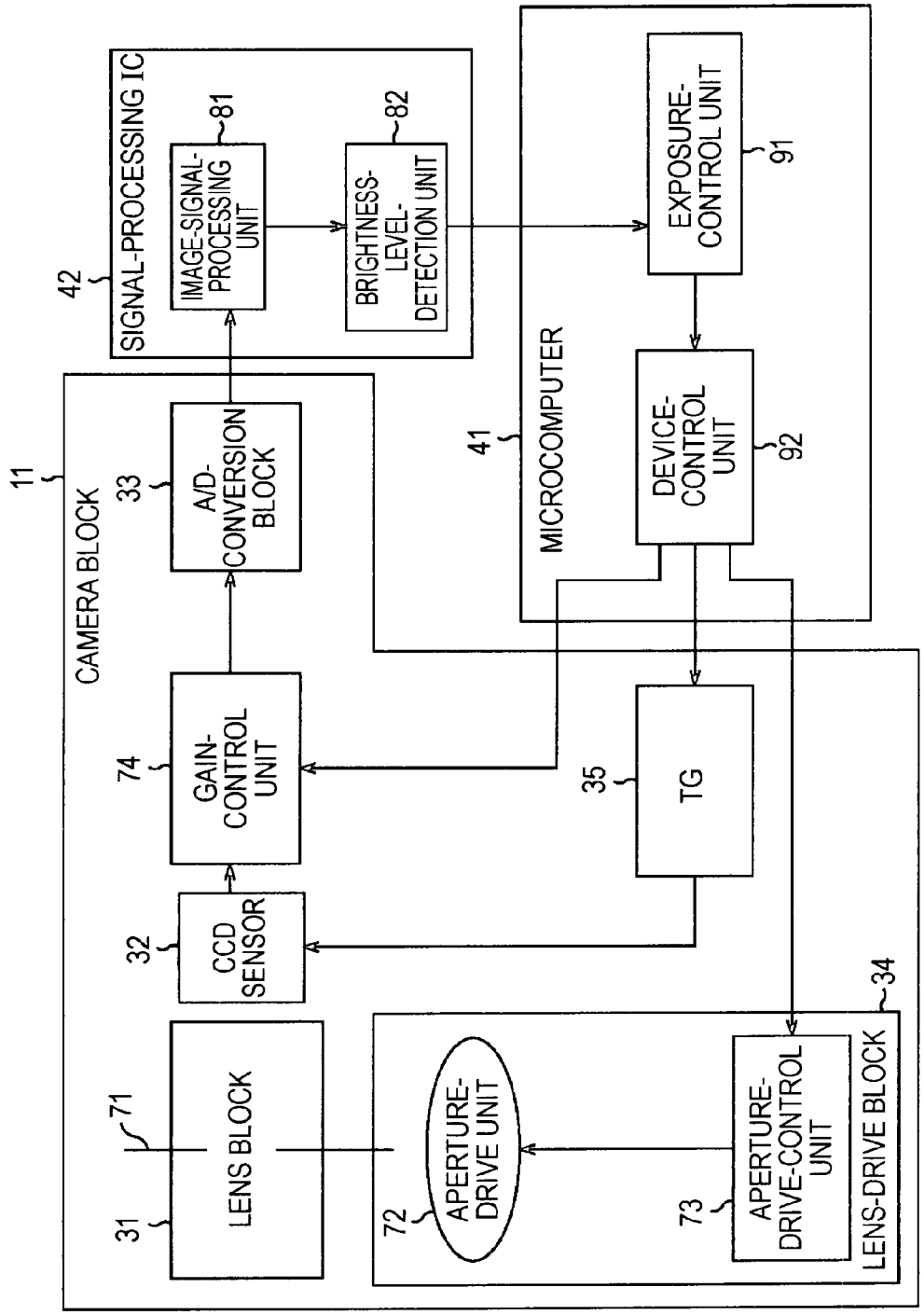
FIG. 4 is a block diagram showing the functional configuration of a part of the digital still camera, the part provided to perform exposure control.

Next, control of the brightness of a photographed image, the control being performed by the digital camera 1, will be described with reference to FIG. 4 illustrating the functional configuration of the digital camera 1, where the functional configuration is mainly related to the brightness control. The control of the image brightness is performed during the above-described camera preprocessing.

In FIG. 4, an aperture 71 is provided in the lens block 31 of the camera block 11 of the digital camera 1. The lens-drive block 34 includes an aperture-drive unit 72 and an aperture-drive-control unit 73. A gain-control unit 74 is provided between the CCD sensor 32 and the A/D-conversion block 33. The signal-processing IC 42 includes an image-signal-processing unit 81 and a brightness-level-detection unit 82, and the microcomputer 41 includes an exposure-control unit 91 and a device-control unit 92, respectively. The configuration other than the above-described functional configuration of the digital camera 1 is the same as the hardware configuration shown in FIG. 1. The same parts shown in FIG. 4 as those shown in FIG. 1 are designated by the same reference numerals, and descriptions of the same parts will not be provided, so as to avoid the description duplication.

The aperture 71 changes the opening diameter thereof, so as to adjust the quantity of light which is made incident upon the CCD sensor 32. The aperture-drive unit 72 includes a stepping motor, for example, and drives the aperture 71 under the control of the aperture-drive-control unit 73. The aperture-drive-control unit 73 includes a motor driver, for example, and controls operations of the aperture-drive unit 72 under the control of the microcomputer 41. That is to say, the aperture value of the aperture 71 is controlled by the microcomputer 41.

The timing generator 35 controls the exposure time by generating a timing signal which makes the CCD sensor 32 operate under the control of the microcomputer 41. The exposure time is controlled by controlling the shutter speed. The exposure time is controlled by controlling the shutter speed. Namely, the shutter-speed control is exercised by the microcomputer 41.

The gain-control unit 74 controls the amplification gain, that is to say, the gain of an image signal which is an analog signal output from the CCD sensor 32 under the control of the microcomputer 41. Namely, the gain is controlled by the microcomputer 41.

Thus, the control of the brightness of a photographed image is exercised by controlling the aperture value, the shutter speed, and the gain. Namely, the brightness of the photographed image is controlled by the microcomputer 41.

The image-signal-processing unit 81 of the signal-processing IC 42 shown in FIG. 4 performs the DSP processing for the image data output from the A/D-conversion block 33 so that the Y/C data is generated. The image-signal-processing unit 81 transmits the generated Y/C data to the brightness-level-detection unit 82.

The brightness-level-detection unit 82 separates brightness data (Y data) from the Y/C data transmitted from the image-signal-processing unit 81 and detects the brightness level. The brightness-level-detection unit 82 transmits data on the detected brightness level to the exposure-control unit 91 of the microcomputer 41.

The exposure-control unit 91 compares the detected brightness level to a brightness level which is the standard by which auto-exposure (AE) processing is controlled and controls the aperture value, the shutter speed, and the gain so that the detected brightness level agrees with the standard-brightness level.

That is to say, the exposure-control unit 91 controls an exposure value (hereinafter referred to as an EV) via the device-control unit 92 by changing the aperture value, the shutter speed, and the gain so that the brightness level detected by the brightness-level-detection unit 82 becomes equivalent to the reference-brightness level. The aperture 71 is controlled via the aperture-drive-control unit 73 and the aperture-drive unit 72 so that the aperture value becomes a predetermined value. The CCD sensor 32 is controlled via the timing generator 35 so that the value of the shutter speed becomes another predetermined value. Further, the gain-control unit 74 is controlled so that the value of the gain becomes another predetermined value.

Here, the brightness level which is the standard by which the AE processing is controlled is calculated based on the value of light reflected from a subject whose brightness is measured, and data on the standard-brightness level is stored in the internal memory of the microcomputer 41 in advance. During the AE processing, control is exercised so that the brightness of a photographed image agrees with the standard-brightness level.

Figure 5:
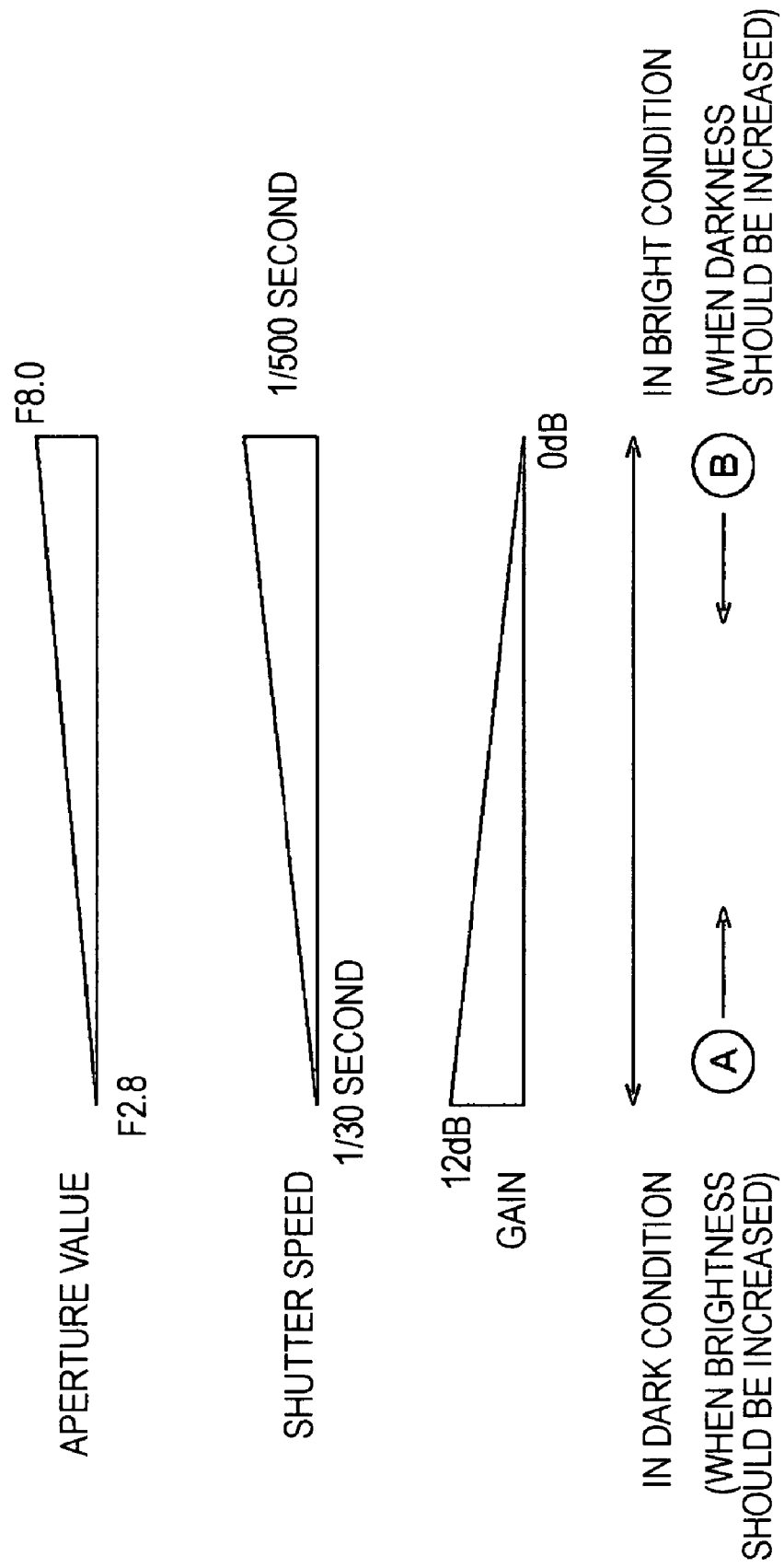
FIG. 5 illustrates brightness control performed based on an aperture value, a shutter speed, and a gain.

FIG. 5 illustrates the brightness control performed based on the aperture value, the shutter speed, and the gain, the brightness control being performed when AE-bracket-photographing mode is set. In FIG. 5, the range of variations in the aperture value, the range of variations in the shutter speed, and the range of variations in the gain are shown in that order in a downward direction.

As shown in FIG. 5, the aperture value varies in the range extending from F2.8 to F8.0, and the shutter speed varies in the range extending from 1/30 second to 1/500 second. Further, the gain varies in the range extending from 0 dB to 12 dB. Each of the aperture value, the shutter speed, and the gain is controlled separately. Therefore, when one of the above-described values is varied, the other values are not varied.

The brightness is controlled so that the higher the brightness level detected by the brightness-level-detection unit 82, namely, the higher the brightness level, the smaller the exposure amount becomes. That is to say, according to FIG. 5, the brightness is controlled so that the variations occur in the right direction. Further, the brightness is controlled so that the lower the brightness level detected by the brightness-level-detection unit 82, namely, the lower the brightness level, the larger the exposure amount becomes. That is to say, according to FIG. 5, the brightness is controlled so that the variations occur in the left direction.

For example, when the detected brightness level is higher than the standard-brightness level, that is to say, when the image is too bright, the brightness is controlled by varying the gain, the shutter speed, or the aperture value, as indicated by arrow A shown in FIG. 5. Further, for example, when the detected brightness level is lower than the standard-brightness level, that is to say, when the image is too dark, the brightness is controlled by varying the gain, the shutter speed, or the aperture value, as indicated by arrow B shown in FIG. 5.

Here, the variation ranges of the aperture value, the shutter speed, and the gain may be determined based on values different from the values of the above-described variation ranges.

When the brightness, that is, the light quantity is doubled, the EV is decreased by as much as 1 EV. Therefore, the aperture-value-variation range extending from F2.8 to F8.0 corresponds to the variation range of the EV corresponding to 3 EV. Further, the shutter-speed-variation range extending from 1/30 second to 1/500 second corresponds to the variation range of the EV corresponding to 4 EV. Similarly, the gain-variation range extending from 0 dB to 12 dB corresponds to the variation range of the EV corresponding to 2 EV.

Figure 6:
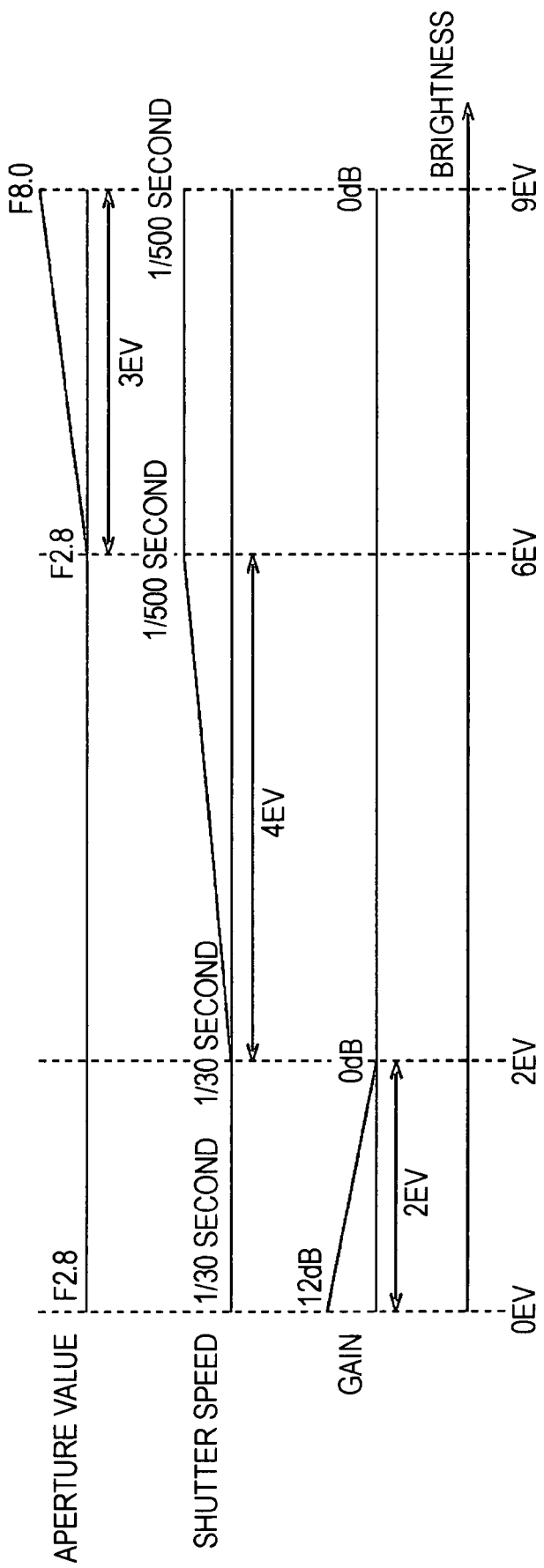
FIG. 6 illustrates EV control performed based on the aperture value, the shutter speed, and the gain.

According to the above-described embodiment, the gain, the shutter speed, and the aperture value are separately controlled in that order, as shown in FIG. 6. Subsequently, if the EV corresponds to 0 EV when the gain value attains 12 dB in the control range corresponding to the EV-variation range, the entire control range of the EV for control becomes the range extending from 0 EV to 9 EV, where the 0 EV-to-9 EV range is obtained by adding the control ranges of the gain corresponding to 2 EV, the shutter speed corresponding to 4 EV, and the aperture value corresponding to 3 EV to one another. Namely, in a segment where the EV corresponds to from 0 EV to 2 EV, the aperture value is held constant at F2.8, the shutter speed is held constant at 1/30 second, and the gain is adjusted so that the gain value is from 12 dB to 0 dB. In a segment where the EV corresponds to from 2 EV to 6 EV, the aperture value is held constant at F2.8, the gain is held constant at 0 dB, and the shutter speed is adjusted so that the shutter speed is from 1/30 second to 1/500 second. In a segment where the EV corresponds to from 6 EV to 9 EV, the shutter speed is held constant at 1/500 second, the gain is held constant at 0 dB, and the aperture value is adjusted so that the aperture value is from F2.8 to F8.0.

Figure 7:
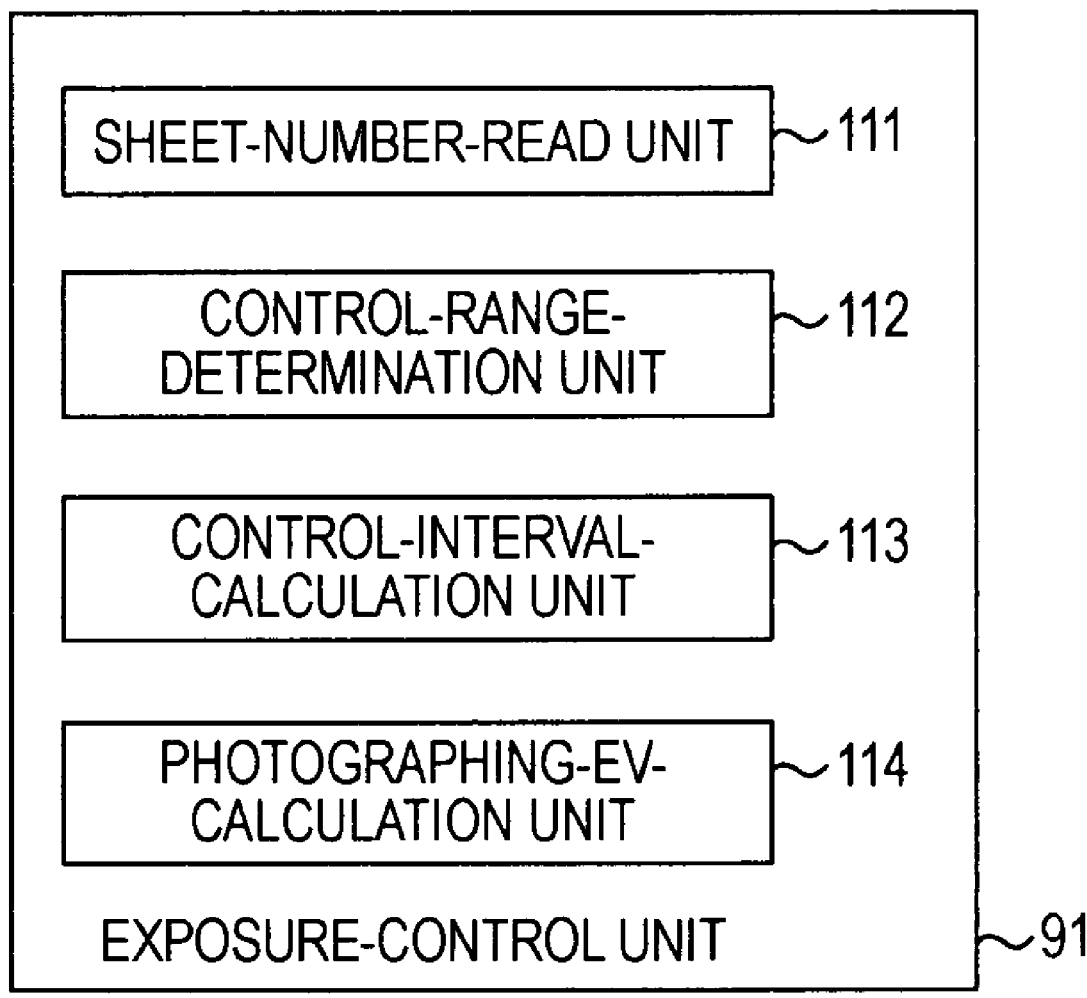
FIG. 7 is a block diagram illustrating the functional configuration of an exposure-control unit.

FIG. 7 is a block diagram showing the functional configuration of the exposure-control unit 91.

The exposure-control unit 91 includes a sheet-number-read unit 11, a control-range-determination unit 112, a control-interval-calculation unit 113, and a photographing-EV-calculation unit 114.

During AE-bracket photographing, the sheet-number-read unit 111 reads data on the number of photographs from the program-flash memory 23, for example. The AE-bracket photographing is performed to photograph a plurality of images corresponding to a reference EV, an EV lower than the reference EV, and an EV higher than the reference EV consecutively at the same time.

The user writes the photograph-number data into the program-flash memory 23 by operating the keyswitch 18 in advance. The photograph-number data may be written and/or read into and/or from not only the program-flash memory 23, but also the memory card 17, the EEPROM 20, the internal memory of the microcomputer 41, and so forth.

The control-range-determination unit 112 determines a controllable range where the EV can be varied in the AE-bracket-photographing mode. More specifically, the control-range-determination unit 112 calculates a range wherein the EV can be controlled based on the aperture-value-variation range, the shutter-speed-variation range, and the gain-variation range. For example, the control-range-determination unit 112 calculates a range where the EV corresponding to from 0 V to 9 EV can be controlled based on each of the aperture-value-variation range extending from F2.8 to F8.0, the shutter-speed-variation range extending from 1/30 second to 1/500 second, and the gain-variation range extending from 0 dB to 12 dB, as shown in FIG. 6. The above-described controllable range may be the maximum range wherein the digital camera 1 can perform control physically and/or a part of the maximum range. In the AE-bracket-photographing mode, part of and/or the entire controllable range is determined to be a control range wherein the EV is actually varied.

The control-range-determination unit 112 determines a controllable-minimum value which is the minimum EV within the controllable range.

Further, the control-range-determination unit 112 determines a controllable-maximum value which is the maximum EV within the controllable range.

Further, the control-range-determination unit 112 calculates the standard EV corresponding to the standard brightness. The standard EV is a reference value provided to control the AE and achieve an appropriate exposure equivalent to an exposure which is set, so as to photograph only one image, in AE mode.

The control-range-determination unit 112 calculates the difference between the calculated standard EV and the controllable-maximum value which is the maximum value of the controllable range, and determines the difference to be a plus-side-control range. Similarly, the control-range-determination unit 112 calculates the difference between the calculated standard EV and the controllable-minimum value, and determines the difference to be a minus-side-control range. The control-range-determination unit 112 compares the plus-side-control range to the minus-side-control range and selects the range smaller than the other. The control-range-determination unit 112 determines a range centered on the standard EV to be a control range, where the range includes a range extending from the standard EV to a value larger than the standard EV by as much as the selected smaller range and a range extending from the standard EV to a value smaller than the standard EV by as much as the selected smaller range.

The control-interval-calculation unit 113 calculates a control interval which is the interval between the photographing EVs according to the photograph number so that the photographing EVs used to perform the AE-bracket photographing are uniformly distributed over the control range. More specifically, the control interval is calculated according to Equation (1) shown below.

control interval=control range/(photograph number−1)  (1)

Further, the control-interval-calculation unit 113 adjusts the photograph number so that the value of the calculated control interval becomes larger than a predetermined threshold value. Then, the control-interval-calculation unit 113 calculates the control interval again according to the adjusted photograph number.

The photographing-EV-calculation unit 114 calculates the photographing EV based on the photograph number, the control interval, and the control-minimum value, where a plurality of the photographing EVs is distributed over the control range. More specifically, the photographing EV is calculated according to Equation (2) shown below.

$$\text{photographing EV} = \text{control-minimum value} + \text{control interval} \times (i-1) \quad (2)$$

Further, the photographing-EV-calculation unit 114 calculates the photographing EV based on the photograph number, the control interval, and the control-maximum value, where a plurality of the photographing EVs is distributed over the control range. More specifically, the photographing EV is calculated according to Equation (3) shown below.

$$\text{photographing EV} = \text{control-maximum value} - \text{control interval} \times (\text{photograph number} - i) \quad (3)$$

Here, in Equations (2) and (3), the sign i denotes how many times the photographing is performed, where the equation i=1, 2, . . . , the photograph number holds.

The photographing-EV-calculation unit 114 transmits data on the calculated photographing EV to the internal memory of the microcomputer 41.

Next, brightness-determination processing performed by the digital camera 1 will be described with reference to FIG. 8.

When the user operates a mode-change dial (not shown) included in the keyswitch 18 so that data on an instruction for specifying the AE-bracket-photographing mode is transmitted to the microcomputer 41, the digital camera 1 performs processing procedures shown in FIG. 8.

At step S31, the sheet-number-read unit 111 reads data on the photograph number from the program-flash memory 23, for example. When the photograph-number data that had already been written into the program-flash memory 23 shows that the photograph number is nine, for example, the sheet-number-read unit 111 reads information indicating that the photograph number is nine from the program-flash memory 23.

At step S32, the control-range-determination unit 112 determines the control range and the control-minimum value. More specifically, a range where the EV can be controlled is calculated based on the aperture-value-variation range, the shutter-speed-variation range, and the gain-variation range. For example, the control-range-determination unit 112 calculates the range where the EV corresponding to from 0 EV to 9 EV can be controlled based on each of the aperture-value-variation range extending from F2.8 to F8.0, the shutter-speed-variation range extending from 1/30 second to 1/500 second, and the gain-variation range extending from 0 dB to 12 dB. Further, the control-range-determination unit 112 determines the controllable-minimum value that can be controlled in the controllable range. Here, the controllable minimum value is determined to be 0 EV, for example. According to the above-described embodiment, the controllable range and the controllable-minimum value are determined to be an actual control range and an actual control-minimum value, respectively.

At step S33, the control-interval-calculation unit 113 calculates a control interval which is the interval between the photographing EVs according to the photograph number so that the photographing EVs are uniformly distributed over the control range. More specifically, the control interval is calculated according to the above-described Equation (1), as below.

$$\text{control interval} = \text{control range}/(\text{photograph number} - 1) \quad (4)$$

$$= 9(EV)/(9(\text{sheets}) - 1$$

$$= 1.125\ (EV)$$

At step S34, the photographing-EV-calculation unit 114 calculates the photographing EVs distributed over the control range based on the photograph number, the control interval, and the control-minimum value. More specifically, the photographing EV is calculated according to the above-described Equation (2), as below.

$$\text{photographing } EV = \text{control-minimum value} + \quad (5)$$
$$\text{control interval} \times (i-1)$$
$$= 0(EV) + 1.125 \times (i-1)$$

The value of the photographing time i is 1, 2, . . . , 9.

Figure 9:
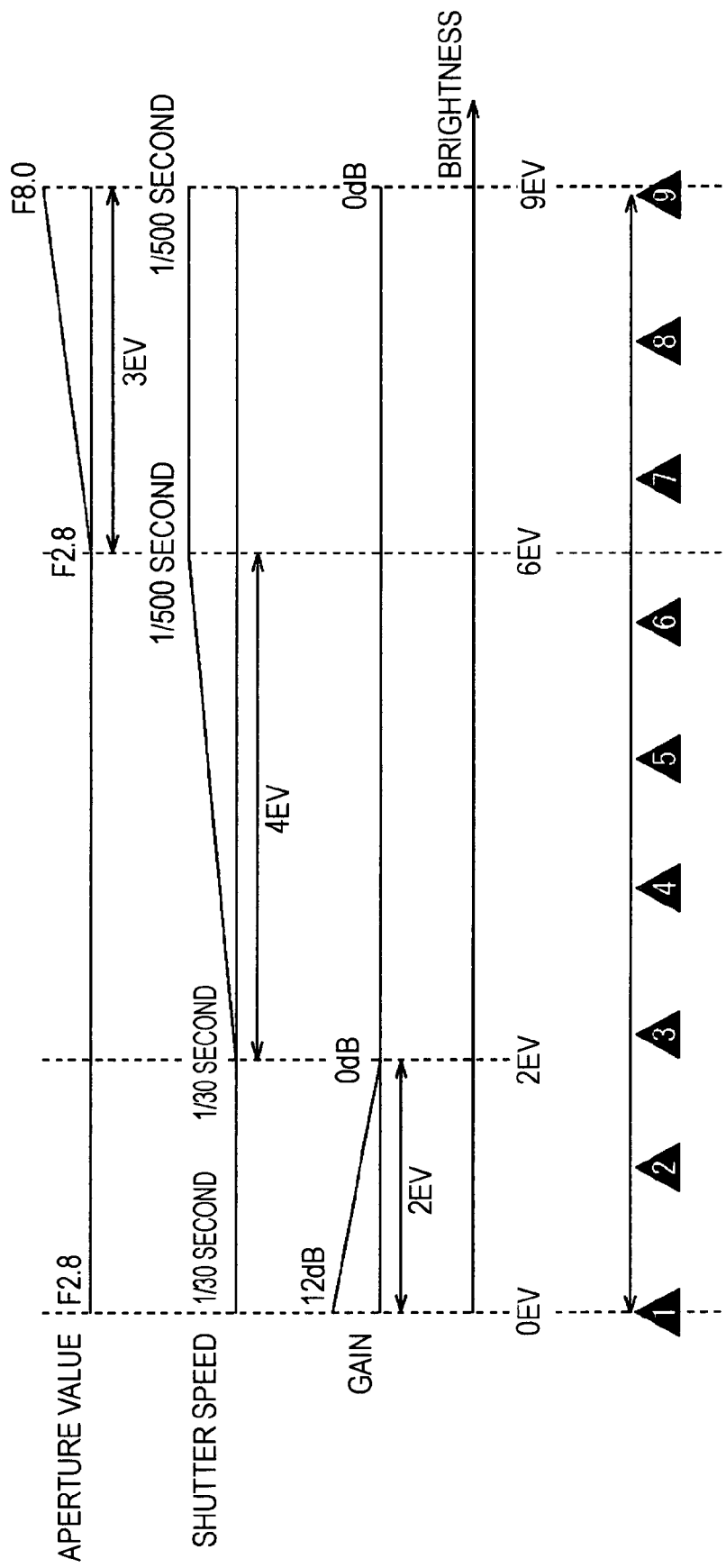
FIG. 9 illustrates calculation of a control interval which is set in a control range, the calculation being performed according to an embodiment of the present invention.

FIG. 9 shows the control interval calculated in the above-described manner.

In FIG. 9, the control range extends from 0 EV to 9 EV, as is the case with FIG. 6. Each of numerals 1 to 9 written in triangles shown in the lower part of FIG. 9 denotes the number of times the AE-bracket photographing is performed. Each of the positions of the triangles corresponds to the photographing EV. According to the embodiment illustrated in FIG. 9, the digital camera 1 photographs nine images consecutively by changing the photographing EV by as much as 1.125 EV at a time from 0 EV to 9 EV.

For example, when the equation i=2 holds, namely, when the second image is photographed during the AE-bracket photographing, the photographing EV of the photographed image becomes 1.125 EV. At that time, the photographing EV is controlled by the gain-control unit 74 which adjusts the gain of an image signal output from the CCD sensor 32 where the aperture value is held constant at F2.8 and the shutter speed is held constant at 1/30 second, as shown in FIG. 9.

Further, for example, when the equation i=5 holds, namely, when the fifth image is photographed during the AE-bracket photographing, the photographing EV of the photographed image becomes 4.5 EV. At that time, the photographing EV is controlled by the timing generator 35 which controls the shutter speed of the CCD sensor 32 where the aperture value is held constant at F2.8 and the gain is held constant at 0 dB, as shown in FIG. 9.

Still further, for example, when the equation i=8 holds, namely, when the eighth image is photographed during the AE-bracket photographing, the photographing EV of the photographed image becomes 7.875 EV. At that time, the photographing EV is controlled by changing the aperture value by driving the aperture 71 via the aperture-drive-control unit 73 and the aperture-drive unit 72 where the shutter speed is held constant at 1/500 second and the gain is held constant at 0 dB, as shown in FIG. 9.

Thus, the digital camera 1 can calculate the photographing EV of each of images photographed through the AE-bracket photographing.

Returning to the flowchart of FIG. 8, at step S35, the photographing-EV-calculation unit 114 transmits data on the calculated photographing EV to the internal memory of the microcomputer 41, for example. The internal memory stores the calculated-photographing-EV data, whereby the brightness-determination processing is finished.

Then, the AE-bracket photographing is performed based on the calculated photographing EV. Namely, at least two images with different brightness levels are consecutively photographed by operating the shutter switch only once. More specifically, the above-described still-image-capture operation is performed the number of times corresponding to a predetermined photograph number according to the calculated photographing EV.

Thus, the digital camera 1 can divide the control range by the uniform control interval according to the number of photographs obtained through the AE-bracket photographing. Therefore, at least two images with different brightness levels can be photographed consecutively. The user can perform the above-described photographing only by specifying the photograph number without performing special operations. Then, the control intervals are uniformly spaced according to the photograph number, and the photographing EVs which are the photographing-exposure values are uniformly distributed over the control range. Therefore, at least two images with different brightness levels can be photographed consecutively without respect to the photograph number.

Figure 10:
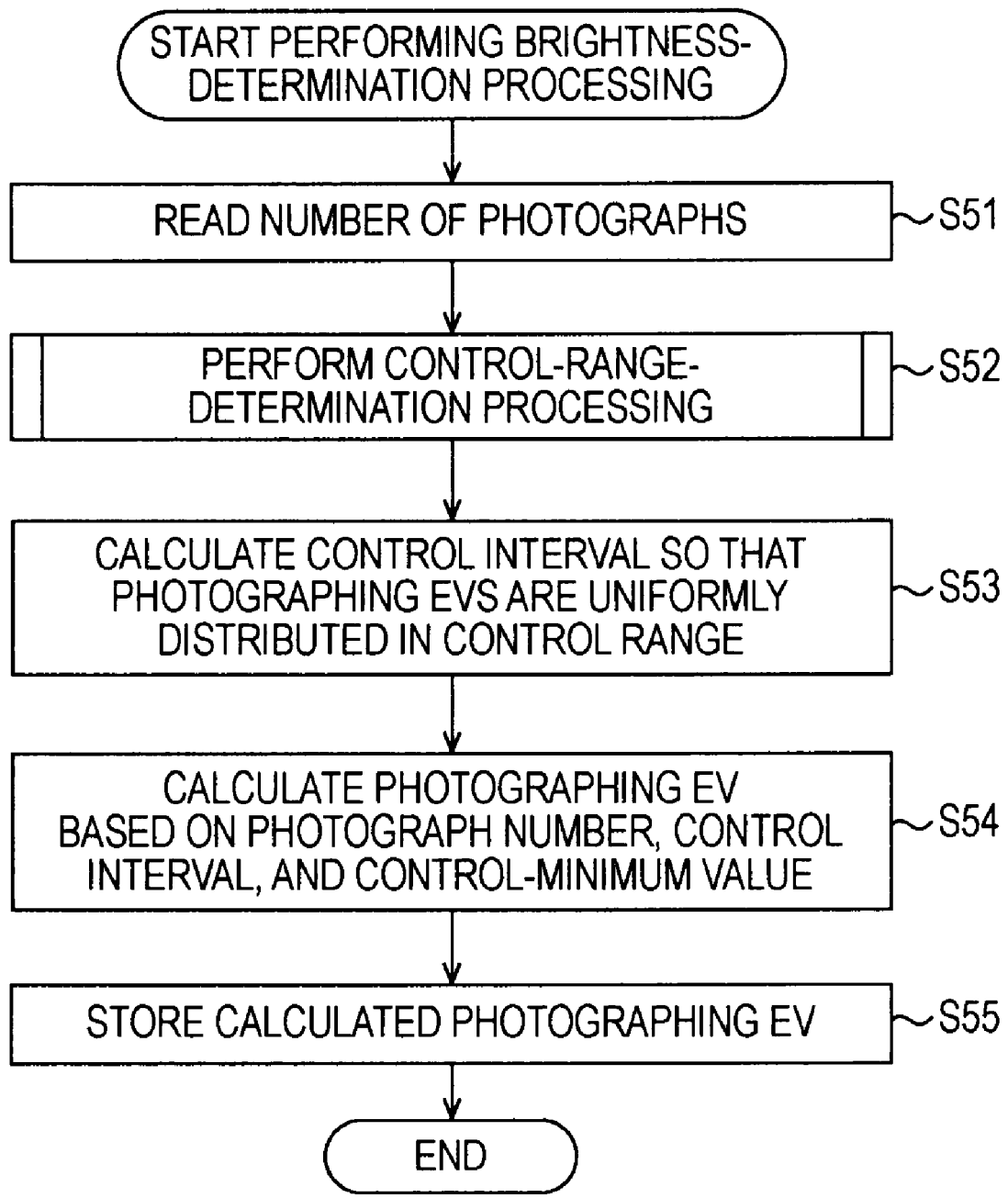
FIG. 10 is a flowchart illustrating brightness-determination processing according to another embodiment of the present invention, the brightness-determination processing being performed by the digital still camera.

FIG. 10 shows a flowchart illustrating brightness-determination-processing procedures according to another embodiment of the present invention, the brightness-determination-processing procedures being performed by the digital camera 1.

In that case, the above-described brightness-determination-processing procedures are also started when the user operates the mode-change dial (not shown) and data on an instruction for specifying the AE-bracket-photographing mode is transmitted to the microcomputer 41.

At step S51, the sheet-number-read unit 111 reads the photograph-number data from the program-flash memory 23, for example. When the photograph-number data that had already been written into the program-flash memory 23 shows that the photograph number is nine, for example, the sheet-number-read unit 111 reads information indicating that the photograph number is nine from the program-flash memory 23.

At step S52, the control-range-determination unit performs control-range-determination processing.

The control-range-determination processing performed, at step S52 shown in FIG. 10, will be described in detail with reference to a flowchart of FIG. 11.

At step S71, the control-range-determination unit calculates the standard EV. More specifically, the control-range-determination unit 112 calculates the standard EV according to each of the aperture value by which an appropriate exposure can be achieved, the shutter speed, and the gain based on light reflected from a subject of which brightness is measured.

At step S72, the control-range-determination unit 112 calculates the difference between the calculated standard EV and the controllable-maximum value of the controllable range, and determines the difference to be the plus-side-control range. Namely, the control-range-determination unit 112 calculates the plus-side-control range.

At step S73, the control-range-determination unit 112 calculates the difference between the standard EV calculated, at step S71, and the controllable-minimum value of the controllable range, and determines the difference to be the minus-side-control range. Namely, the control-range-determination unit 112 calculates the minus-side-control range.

At step S74, the control-range-determination unit 112 calculates the control range and the control-minimum value. More specifically, the control-range-determination unit 112 compares the plus-side-control range to the minus-side-control range and selects the range smaller than the other. The control-range-determination unit 112 determines a range centered on the standard EV to be an actual control range, where the range includes a range extending from the standard EV to a value larger than the standard EV by as much as the selected smaller range and a range extending from the standard EV to a value smaller than the standard EV by as much as the selected smaller range. Further, the control-range-determination unit 112 determines the minimum value of the control range to be the control-minimum value.

Here, of the plus-side-control range and the minus-side-control range, the range smaller than the other is expressed, as Min (plus-side-control range, minimum-side-control range). In that case, an actual control range and an actual control-minimum value are calculated, as below.

control-minimum value=standard EV−Min(plus-side-control range, minus-side-control range)  (6)

control range=control-minimum value+Min(plus-side-control range, minus-side-control range)×2  (7)

At step S75, the control-range-determination unit 112 transmits data on the calculated control range and control-minimum value to the internal memory of the microcomputer 41, for example. The internal memory stores the transmitted data, whereby the control-range-determination processing is finished.

Figure 12:
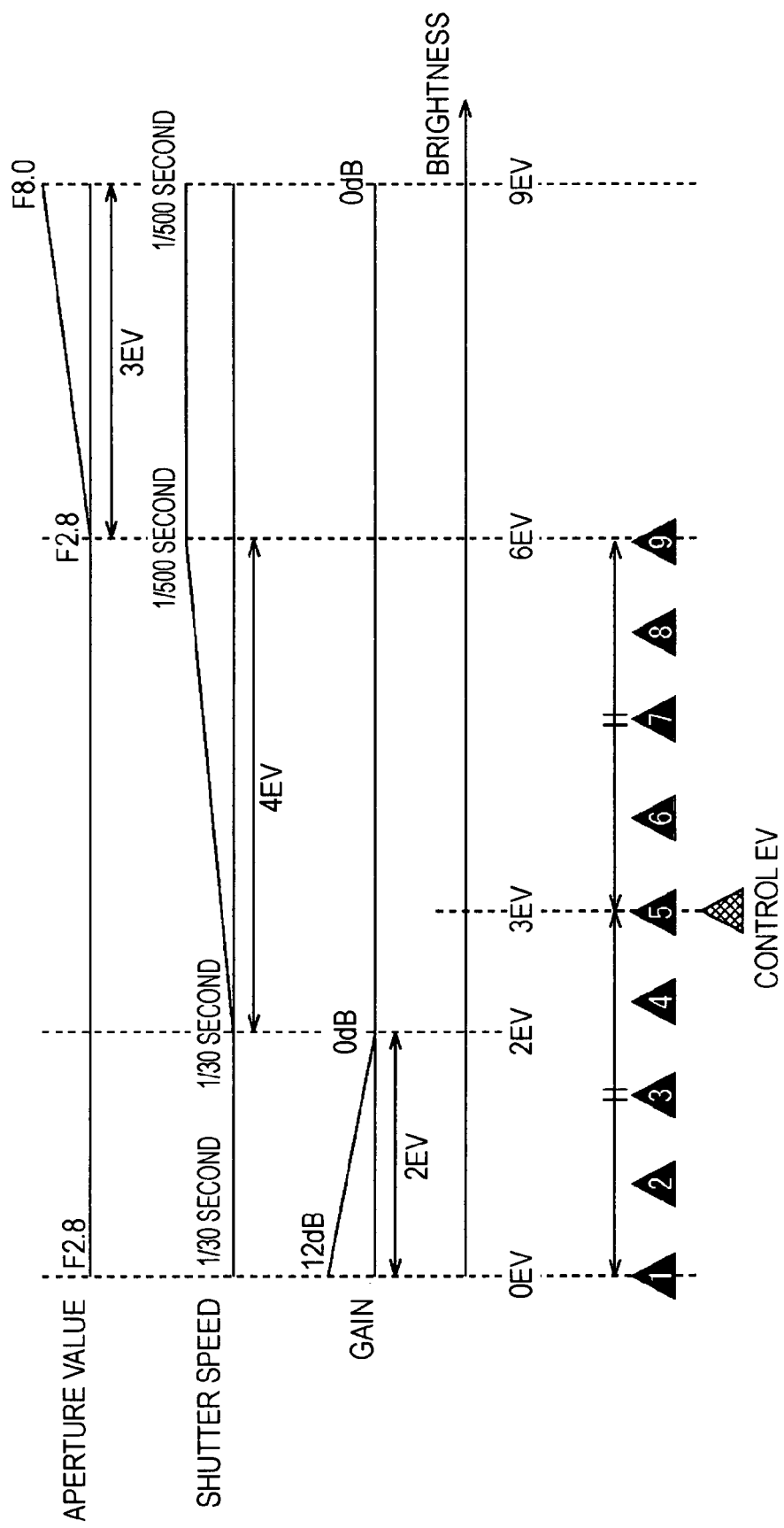
FIG. 12 illustrates calculation of a control interval which is set in the control range, the calculation being performed according to another embodiment of the present invention.

FIG. 12 shows an example of the control interval calculated in the above-described manner.

As shown in FIG. 12, a range that can be the controllable range extends from 0 EV to 9 EV. According to the above-described method, when the calculated standard EV is 3 EV, for example, the plus-side-control range is indicated by the equation 9 EV−3 EV=6 EV, and the minus-side-control range is indicated by the equation 3 EV−0 EV=3 EV. Subsequently, the equation Min(plus-side-control area, minus-side-control area)=3 EV holds. Therefore, the actual control range and the actual control-minimum value are calculated according to the above-described Equations (6) and (7), as below.

$$\text{control-minimum value} = \text{standard } EV - \tag{8}$$
$$\text{Min}\begin{pmatrix} \text{plus-side-control range,} \\ \text{minus-side-control range} \end{pmatrix}$$
$$= 3(EV) - 3(EV)$$
$$= 0(EV)$$

$$\text{control range} = \text{control-minimum value} + \tag{9}$$
$$\text{Min}\begin{pmatrix} \text{plus-side-control range,} \\ \text{minus-side-control range} \end{pmatrix} \times 2$$
$$= 0(EV) + 3(EV) \times 2$$
$$= 6(EV)$$

Namely, the actual control range extends from 0 EV to 6 EV.

Thus, the digital camera 1 can determine the control range centered on the standard EV. Subsequently, it becomes possible to obtain the image corresponding to the standard EV during the AE-bracket photographing, the image being obtained through ordinary AE-mode photographing.

Returning to the flowchart of FIG. 10, at step S53, the control-interval-calculation unit 113 calculates a control interval which is the interval between the photographing EVs according to the photograph number so that the photographing EVs are uniformly distributed over the calculated control range. More specifically, the control interval is calculated according to the above-described Equation (1), as below.

$$\text{control interval} = \text{control range}/(\text{photograph number}-1) \tag{10}$$
$$= 6(EV)/(9(\text{sheets})-1)$$
$$= 0.75(EV)$$

Each of numerals 1 to 9 written in triangles shown in the lower part of FIG. 12 denotes the number of times the AE-bracket photographing is performed. Each of the positions of the triangles corresponds to the photographing EV. According to the embodiment illustrated in FIG. 12, the digital camera 1 photographs nine images consecutively by changing the photographing EV by as much as 0.75 EV at a time from 0 EV to 9 EV.

At step S54, the photographing-EV-calculation unit 114 calculates the photographing EVs distributed over the control range based on the photograph number, the control interval, and the control-minimum value. More specifically, the photographing EV is calculated according to the above-described Equation (2), as below.

$$\text{photographing } EV = \text{control-minimum value} + \qquad (11)$$
$$\text{control interval} \times (i-1)$$
$$= 0(EV) + 0.75 \times (i-1)$$

The value of the photographing time i is 1, 2, ..., 9.

For example, when the equation i=2 holds, namely, when the second image is photographed during the AE-bracket photographing, the photographing EV of the photographed image becomes 0.75 EV. At that time, control of the photographing EV is achieved by changing the gain where the aperture value is held constant at F2.8 and the shutter speed is held constant at 1/30 second, as shown in FIG. 12.

Further, for example, when the equation i=5 holds, namely, when the fifth image is photographed during the AE-bracket photographing, the photographing EV of the photographed image becomes 3 EV, that is to say, the standard EV. At that time, control of the photographing EV is achieved by changing the shutter speed while holding the aperture value constant at F2.8 and holding the gain constant at 0 dB, as shown in FIG. 12.

Still further, for example, when the equation i=8 holds, namely, when the eighth image is photographed during the AE-bracket photographing, the photographing EV of the photographed image becomes 5.25 EV. At that time, control of the photographing EV is achieved by changing the shutter speed while holding the aperture value constant at F2.8 and holding the gain constant at 0 dB, as shown in FIG. 12.

Thus, the digital camera 1 can calculate the photographing EV of each of images photographed through the AE-bracket photographing.

Returning to the flowchart of FIG. 10, at step S55, the photographing-EV-calculation unit 114 transmits data on the calculated photographing EV to the internal memory of the microcomputer 41. The internal memory stores the calculated-photographing-EV data, whereby the brightness-determination processing is finished.

Thus, the digital camera 1 can divide the control range centered on the standard EV by the uniform control interval according to the number of photographs obtained through the AE-bracket photographing. After that, the AE-bracket photographing is actually performed.

Further, at step S74 shown in the flowchart of FIG. 11, the control range is calculated based on the control-minimum value. However, the control range may be calculated based on the control-maximum value. More specifically, the control range may be calculated, as below.

$$\text{control-maximum value} = \text{standard EV} + \text{Min(plus-side-} \qquad (12)$$
$$\text{control range, minus-side-control range)}$$

$$\text{control range} = \text{control-maximum value} - \text{Min(plus-} \qquad (13)$$
$$\text{side-control range, minus-side-control range)} \times 2$$

As described above, according to the embodiment illustrated in FIG. 12, photographing is performed without fail, at the standard EV, so as to control the AE. However, according to the embodiment illustrated in FIG. 9, the photographing EV is calculated without respect to the standard EV. Therefore, the photographing is not necessarily performed, at the standard EV. Subsequently, according to the embodiment illustrated in FIG. 9, the photographing may be performed, at the calculated photographing EV, in addition to the calculated standard EV.

Further, according to the embodiment illustrated in FIG. 9, the photographing-EV control is achieved by changing each of the aperture value, the shutter speed, and the gain. However, according to the embodiment illustrated in FIG. 12, the photographing-EV control is achieved by changing the shutter speed and the gain. Thus, according to the above-described embodiments, the control range is determined based on all of and/or a combination of at least two of the aperture value, the shutter speed, and the gain. However, the control range may be determined based on at least one of the aperture value, the shutter speed, and the gain.

Further, according to the embodiments illustrated in FIGS. 9 and 12, the photographing EV is calculated according to Equation (2). However, the photographing EV may be calculated according to Equation (3). Namely, at step S34 shown in FIG. 8 and/or step S54 shown in FIG. 10, the photographing-EV-calculation unit 114 may calculate photographing EVs distributed over the control range based on the photograph number, the control interval, and the control-maximum value.

FIG. 13 shows a flowchart showing brightness-determination processing according to another embodiment of the present invention.

The above-described brightness-determination processing is also started when the user operates the mode-change dial (not shown) and data on an instruction for specifying the AE-bracket-photographing mode is transmitted to the microcomputer 41.

Since details on processing procedures performed, at steps S91, S92, and S93 that are shown in the flowchart of FIG. 13 are the same as those on the processing procedures performed, at steps S31, S32, and S33 that are shown in the flowchart of FIG. 8, the description thereof is omitted.

At step S94, the control-interval-calculation unit 113 determines whether or not the value of the calculated control interval is equivalent to and/or larger than a predetermined threshold value. The threshold value should be the value of a control interval which is set so that the brightness levels of images photographed consecutively during the AE-bracket photographing become different from each other. For example, the control-interval-calculation unit 113 determines whether or not the interval between the photographing EV obtained when the first image is photographed during the AE-bracket photographing and that obtained when the second image is photographed, the interval being shown in FIG. 14, is equivalent to 1/3EV≈0.333 EV or more. If it is determined that the value of the calculated control interval is not equivalent to the threshold value or more, at step S94, the processing advances to step S95.

At step S95, the control-interval-calculation unit 113 determines whether or not the photograph number is at least two. If it is determined that the photograph number is at least two, at step S95, the processing advances to step S96.

At step S96, the control-interval-calculation unit 113 decrements the photograph number by one. After that, the processing returns to step S91 and the processing from step S91 on down is performed repeatedly until the photograph number becomes one. At that time, step S92 performed for a second time and beyond has no dependence on the photograph number. Therefore, step S92 may not be performed for a second time and beyond. Further, when the value of the photograph number becomes one through the processing corresponding to step S96, only one photographing EV exists in the control range. At step S93, therefore, the value of the control range is calculated, as 0 EV, for example.

On the other hand, if it is determined that the value of the control interval is equivalent to the threshold value or more, at step S94, that is to say, if the control interval is set so that the brightness levels of photographed images are different from each other, the processing advances to step S97.

Further, if it is determined that the photograph number is not at least two, at step S95, that is to say, if the photograph number is one, the processing advances to step S97.

At step S97, the photographing-EV-calculation unit 114 calculates the photographing EVs distributed over the control range based on the photograph number, the control interval, and the control-minimum value, as is the case with step S34 shown in FIG. 8 and step S54 shown in FIG. 10.

When the photograph number is one, at step S97, it may be considered that there is no difference between the EVs distributed over the control range, that is to say, there is little difference between the image-brightness levels. Therefore, the photographing EV is set to a value which is the center of the control range and/or the standard EV, for example.

At step S98, the photographing-EV-calculation unit 114 transmits data on the calculated photographing EV to the internal memory of the microcomputer 41. The internal memory stores the calculated-photographing-EV data, whereby the brightness-determination processing is finished.

Thus, when no difference occurs between the brightness levels during the AE-bracket photographing, the digital camera 1 adjusts the control interval by decrementing the photograph number. As a result, a plurality of images with brightness levels sufficiently different from each other can be photographed.

According to the above-described embodiments, the processing corresponding to steps S91 to S93 that are shown in the flowchart of FIG. 13 is the same as that corresponding to steps S31 to S33 that are shown in the flowchart of FIG. 8. However, the processing corresponding to steps S91 to S93 that are shown in the flowchart of FIG. 13 may be the same as that corresponding to steps S51 to S53 that are shown in the flowchart of FIG. 10.

Further, the user specifies the photograph number in advance by operating the keyswitch 18, as described above. However, a predetermined photograph number may be automatically set when the AE-bracket-photographing mode is selected, for example.

Thus, the digital camera 1 can photograph a plurality of images with appropriate brightness levels consecutively during the AE-bracket photographing, where the number of the plurality of images is a predetermined photograph number. Further, many images with brightness levels that are practically the same as each other are not photographed. Therefore, it becomes possible to prevent memory from being wasted.

Further, the so-called overlap photographing may be performed by superimposing a plurality of photographed images with different brightness levels on each other so that the composite image corresponding to a wide-dynamic range is generated.

Thus, a plurality of images with different exposure values can be photographed consecutively by changing the exposure value. Further, when a control range which is a range wherein the exposure value is varied is determined and when the control interval which is the interval between the photographing-exposure values is calculated so that the photographing-exposure values which are exposure values existing in the control range and which are the exposure values of photographed images are uniformly distributed over the control range according to the number of photographed images, a plurality of images with appropriately different brightness levels can be photographed consecutively regardless of the photograph number without requesting the user to perform complicated operations.

Thus, the above-described embodiments of the present invention are used for the digital camera. However, an embodiment of the present invention can be used for a mobile phone provided with a camera and a photographing device having other image-pickup functions.

The above-described series of processing procedures can be performed by using hardware and/or software. When the series of processing procedures are performed by using the software, a program forming the software is installed from the program-flash memory 23 into the microcomputer 41.

Further, in this specification, steps describing the program stored in the program-flash memory 23 include not only processing executed in time sequence according to the written order but also processing that is not necessarily executed in time sequence but can be executed in parallel and/or separately.

It should be understood by those skilled in the art that various modifications, combinations, sub-combinations and alterations may occur depending on design requirements and other factors insofar as they are within the scope of the appended claims or the equivalents thereof.

The invention claimed is:

1. A photographing device configured to photograph a plurality of images consecutively by changing an exposure value, the photographing device comprising:

control-range-determination means configured to determine a control range which is a range where the exposure value is varied; and interval-calculation means configured to calculate a control interval which is an interval between photographing-exposure values that are exposure values existing in the control range and that are exposure values of the photographed images so that the photographing-exposure values are uniformly distributed over the control range according to a number of the photographed images, wherein the interval-calculation means determines whether or not the control interval is equivalent to a predetermined threshold value or more, decrements the photograph number until the control interval is equivalent to the threshold value or more when the control interval is smaller than the threshold value, and calculates the control interval according to the incremented photograph number.

2. The photographing device according to claim 1, wherein the control-range-determination means determines a range where the exposure value is varied according to at least one and/or a combination of at least two of an aperture value, a shutter speed, and a gain of an image signal to be the control range.

3. The photographing device according to claim 2, wherein the control-range-determination means determines a control-minimum value which is a minimum value of the exposure value existing in the control range, further comprising exposure-value-calculation means configured to calculate the photographing-exposure values distributed over the control range based on the photograph number, the control interval, and the control-minimum value.

4. The photographing device according to claim 3, wherein the control-range-determination means determines a controllable range where the photographing device can physically control the exposure value to be the control range.

5. The photographing device according to claim 2, wherein the control-range-determination means determines a predetermined range to be the control range, where the predetermined range includes a range extending from a standard value of the exposure value to a value smaller than the standard value by as much as a size of a smaller one of a difference between the standard value and a maximum value of a controllable range where the photographing device can physically control the exposure value and a difference between the standard value and a minimum value of the controllable range, and a range extending from the standard value to a value larger than the standard value by as much as the size of the smaller one.

6. A photographing method provided to photograph a plurality of images consecutively by changing an exposure value, the photographing method comprising:
    determining a control range which is a range where the exposure value is varied; and
    calculating a control interval which is an interval between photographing-exposure values that are exposure values existing in the control range and that are exposure values of the photographed images so that the photographing exposure values are uniformly distributed over the control range according to a number of the photographed images,
    wherein the calculating includes determining whether or not the control interval is equivalent to a predetermined threshold value or more, decrementing the photograph number until the control interval is equivalent to the threshold value or more when the control interval is smaller than the threshold value, and calculating the control interval according to the decremented photograph number.

7. A computer readable memory having stored thereon a program for making a computer execute photographing processing, so as to photograph a plurality of images consecutively by changing an exposure value, the program comprising:
    determining a control range which is a range where the exposure value is varied; and
    calculating a control interval which is an interval between photographing-exposure values that are exposure values existing in the control range and that are exposure values of the photographed images so that the photographing-exposure values are uniformly distributed aver the control range according to a number of the photographed images,
    wherein the calculating includes determining whether or not the control interval is equivalent to a predetermined threshold value or more, decrementing the photograph number until the control interval is equivalent to the threshold value or more when the control interval is smaller than the threshold value, and calculating the control interval according to the decremented photograph number.

8. A photographing device configured to photograph a plurality of images consecutively by changing an exposure value, the photographing device comprising:
    a control-range-determination unit configured to determine a control range which is a range where the exposure value is varied; and
    an interval-calculation unit configured to calculate a control interval which is an interval between photographing-exposure values that are exposure values existing in the control range and that are exposure values of the photographed images so that the photographing-exposure values are uniformly distributed over the control range according to a number of the photographed images,
    wherein the interval-calculation unit is operable to determine whether or not the control interval is equivalent to a predetermined threshold value or more, decrement the photograph number until the control interval is equivalent to the threshold value or more when the control interval is smaller than the threshold value, and calculate the control interval according to the decremented photograph number.

* * * * *